(12) United States Patent
Lim

(10) Patent No.: US 8,804,085 B2
(45) Date of Patent: Aug. 12, 2014

(54) LIQUID CRYSTAL DISPLAY

(75) Inventor: Yong Woon Lim, Seoul (KR)

(73) Assignee: Samsung Display Co., Ltd. (KR)

( * ) Notice: Subject to any disclaimer, the term of this patent is extended or adjusted under 35 U.S.C. 154(b) by 145 days.

(21) Appl. No.: 13/617,186

(22) Filed: Sep. 14, 2012

(65) Prior Publication Data

US 2013/0300991 A1 Nov. 14, 2013

(30) Foreign Application Priority Data

May 9, 2012 (KR) ........................ 10-2012-0049312

(51) Int. Cl.
*G02F 1/1343* (2006.01)
*G02F 1/1337* (2006.01)

(52) U.S. Cl.
USPC ............................ 349/146; 349/139; 349/123

(58) Field of Classification Search
CPC ................... G02F 1/134336; G02F 1/134309; G02F 1/133707; G02F 1/134363; G02F 1/136286; G02F 1/133711; G02F 1/1393; G02F 1/1337
USPC .......................................... 349/146, 139, 123
See application file for complete search history.

(56) References Cited

U.S. PATENT DOCUMENTS

| | | | | |
|---|---|---|---|---|
| 8,035,787 B2 * | 10/2011 | Jung et al. | ...................... | 349/141 |
| 8,098,358 B2 * | 1/2012 | Kim et al. | ...................... | 349/141 |
| 8,314,913 B2 * | 11/2012 | Um et al. | ...................... | 349/141 |
| 8,368,826 B2 * | 2/2013 | Kim et al. | ........................ | 349/38 |
| 8,368,862 B2 * | 2/2013 | Kim et al. | ...................... | 349/144 |
| 8,445,080 B2 * | 5/2013 | Byun et al. | ................... | 428/1.26 |
| 2008/0036931 A1 | 2/2008 | Chan et al. | | |
| 2009/0244425 A1 | 10/2009 | Jung et al. | | |
| 2010/0053528 A1 | 3/2010 | Li et al. | | |
| 2010/0103357 A1 | 4/2010 | Kye et al. | | |
| 2010/0182556 A1 | 7/2010 | Oh et al. | | |
| 2011/0096257 A1 | 4/2011 | Ting et al. | | |
| 2011/0149220 A1 | 6/2011 | Byun et al. | | |

FOREIGN PATENT DOCUMENTS

| | | | |
|---|---|---|---|
| JP | 2009175557 A | 8/2009 | |
| JP | 2009294320 A | 12/2009 | |

* cited by examiner

*Primary Examiner* — Mike Qi
(74) *Attorney, Agent, or Firm* — Cantor Colburn LLP

(57) ABSTRACT

A liquid crystal display includes: a first substrate; and a pixel electrode disposed on the first substrate. The pixel electrode includes a first sub-pixel electrode and a second sub-pixel electrode. The first sub-pixel electrode and the second sub-pixel electrode include a cross stem, and a plurality of minute branches extending from the cross stem. The second sub-pixel electrode includes two cross stems disposed adjacent in a column direction, and a center transverse stem disposed between the two cross stems. The center transverse stem includes a cutout.

25 Claims, 21 Drawing Sheets

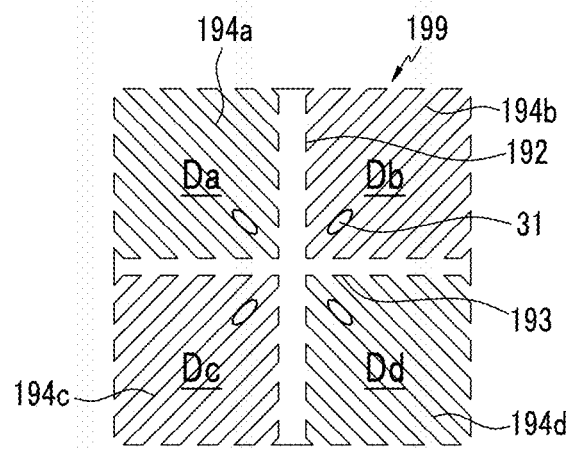

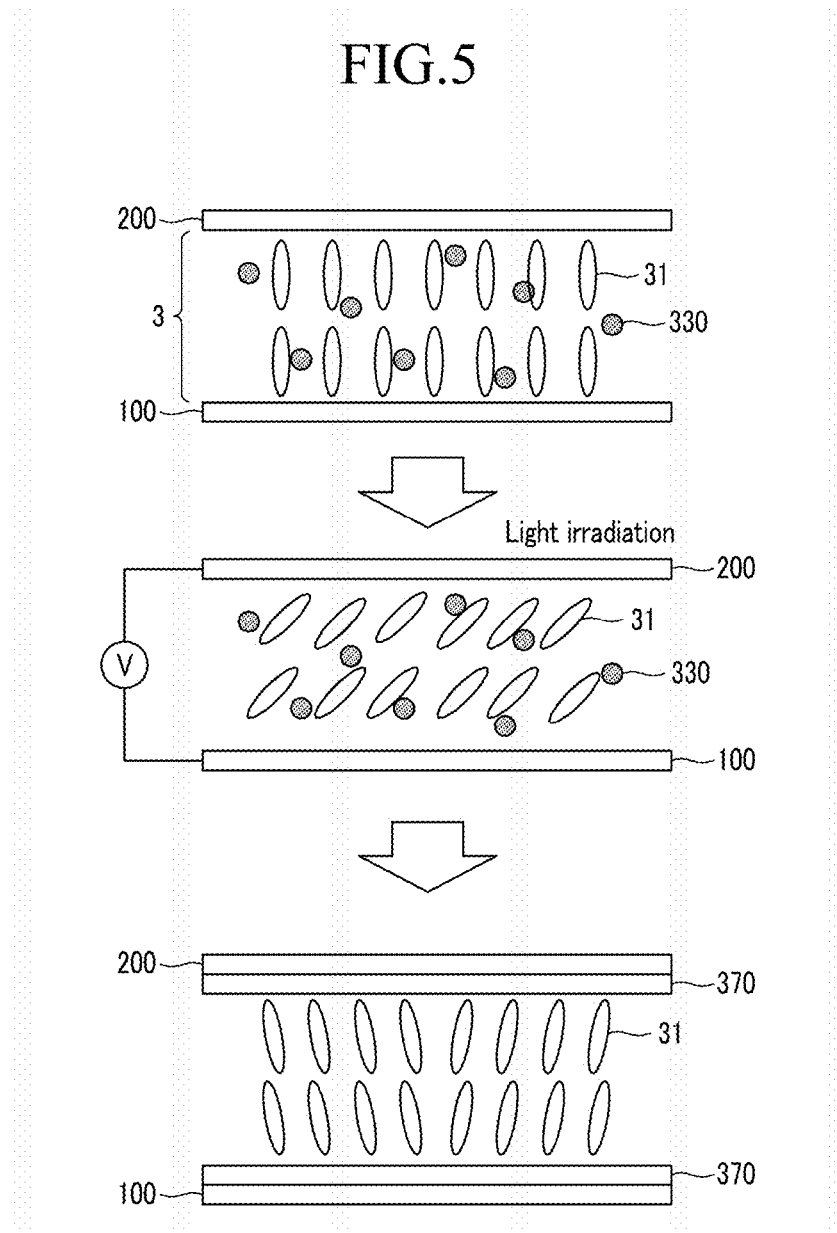

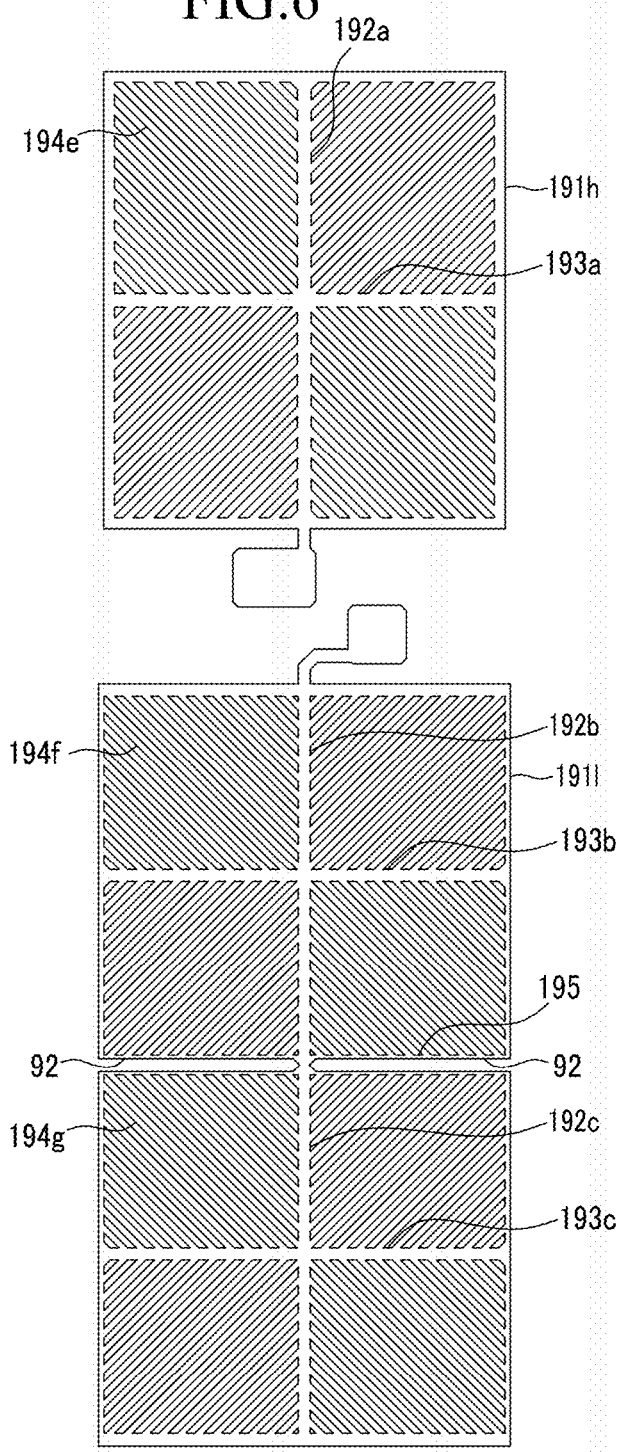

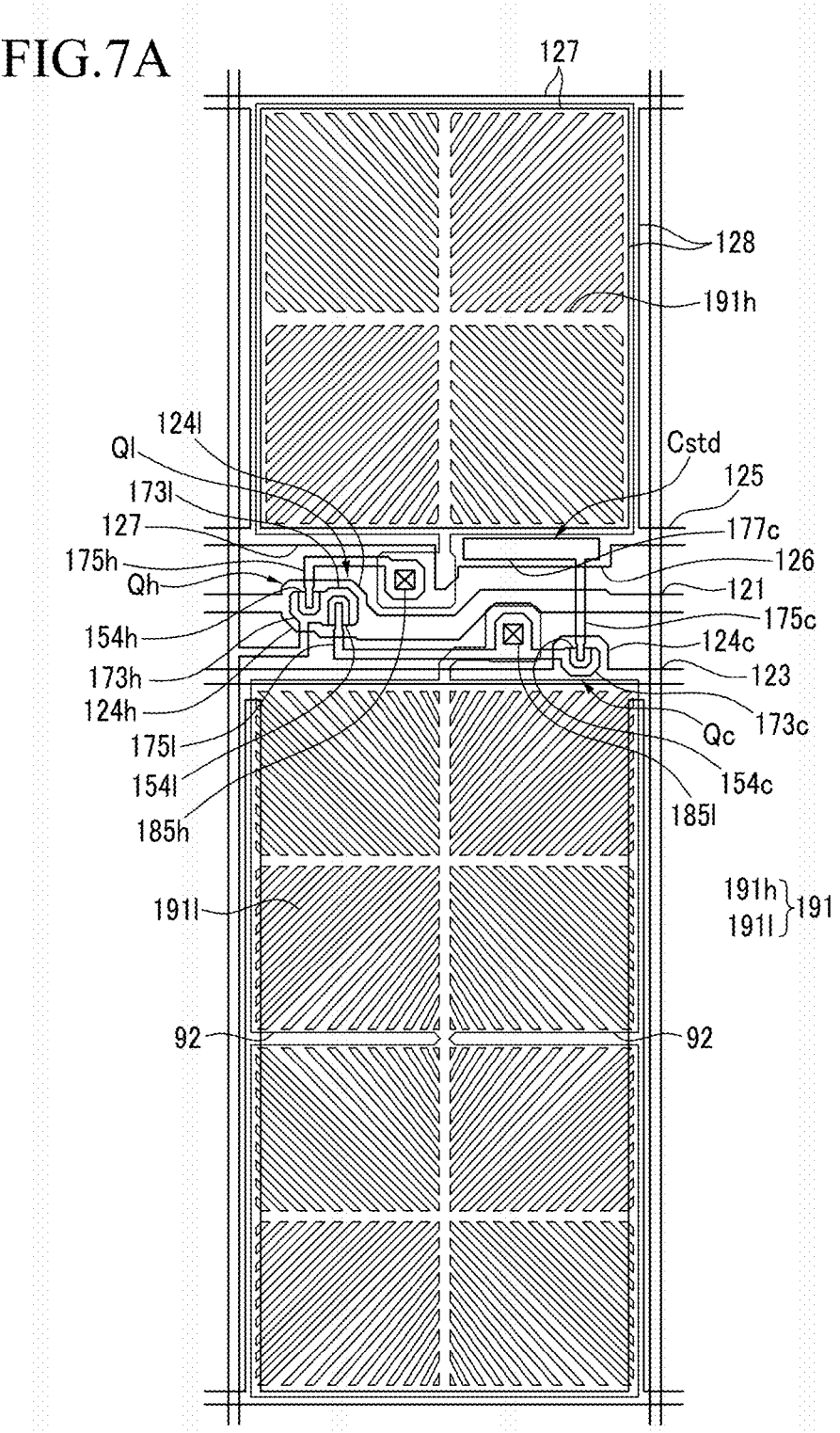

FIG.8A
(a)
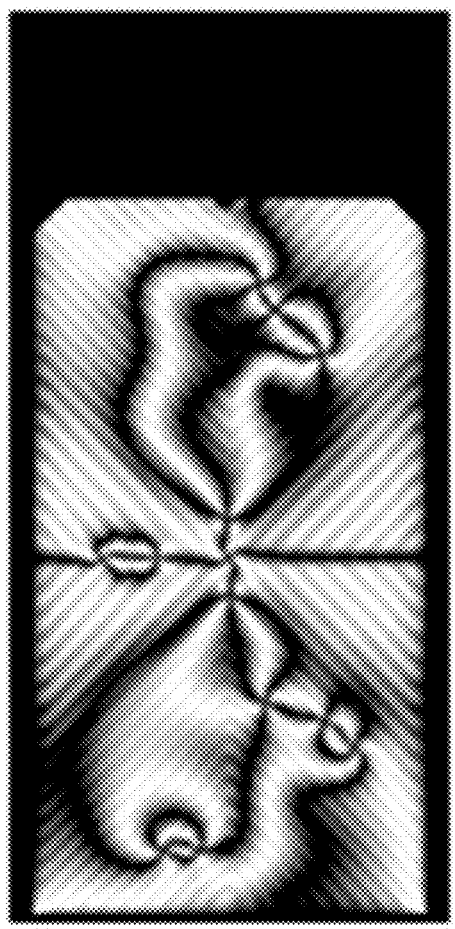
(b)

FIG.8B
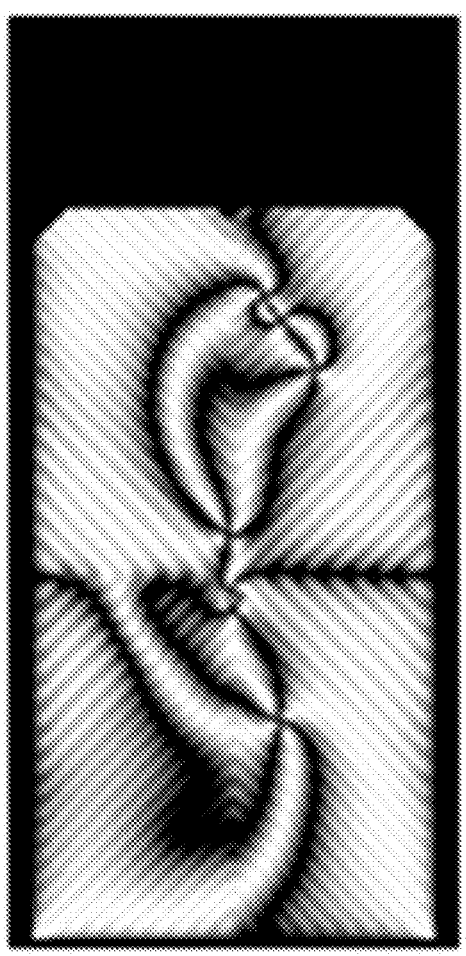
(a)　　　　　　　　(b)

FIG.8C
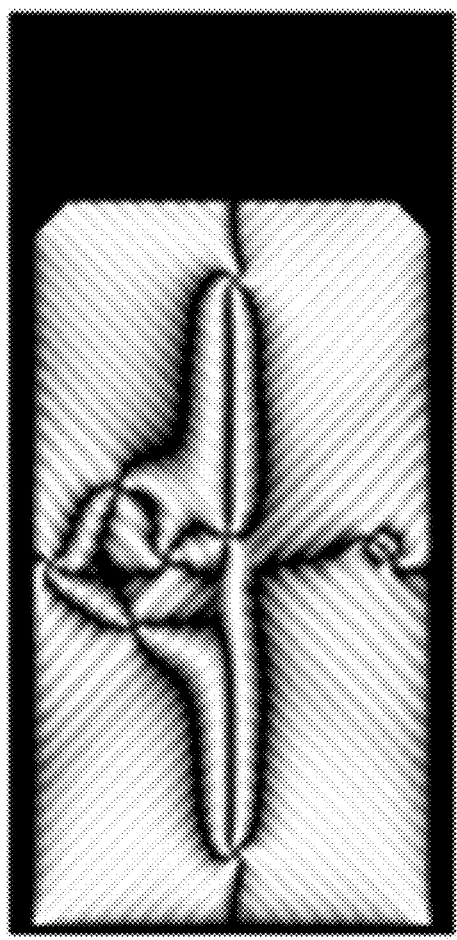
(a)　　　　　　　　　(b)

LIQUID CRYSTAL DISPLAY

This application claims priority to Korean Patent Application No. 10-2012-0049312 filed on May 9, 2012, and all the benefits accruing therefrom under 35 U.S.C. §119, the entire contents of which are incorporated herein by reference.

BACKGROUND (a) Field

The invention relates to a liquid crystal display.

(b) Description of the Related Art

Liquid crystal displays ("LCDs") are widely used among display devices as one type of flat panel displays. A liquid crystal display has two display panels on which field generating electrodes such as pixel electrodes and a common electrode are formed, and a liquid crystal layer that is interposed between the display panels. The liquid crystal display applies voltages to the field generating electrodes so as to generate an electric field in the liquid crystal layer. The electric field in the liquid crystal layer determines the alignment of liquid crystal ("LC") molecules of the liquid crystal layer and thus the polarization of incident light, thereby performing image display.

Among the LCDs, a vertical alignment ("VA") mode LCD, which aligns LC molecules such that their long axes are perpendicular to the panels in the absence of an electric field, has been developed.

In a VA mode LCD, a wide viewing angle that is an important characteristic of a display device can be realized by forming cutouts such as minute slits in the field-generating electrodes and/or forming protrusions on the field-generating electrodes. Since the cutouts and protrusions can determine the tilt directions of the LC molecules, the tilt directions can be distributed into various directions by using the cutouts and protrusions such that the reference viewing angle is widened.

Also, a method for providing a pretilt to the liquid crystal in the absence of an electric field has been developed to improve the response speed of the liquid crystal while realizing the wide viewing angle. For the liquid crystal to have the pretilt of the various directions, alignment layers having various alignment directions may be used, or the liquid crystal layer is applied with the electric field and a thermal-hardened or light-hardened material is added, and the light may be irradiated to slant the liquid crystal in predetermined directions.

On the other hand, the VA mode LCD has lower side visibility compared with front visibility, such that one pixel is divided into two subpixels and different voltages are applied to the subpixels to solve this problem.

SUMMARY

One or more exemplary embodiment of the invention provides a liquid crystal display having a wide viewing angle and a fast response speed, and having reduced texture for good display quality, as well as excellent visibility and transmittance.

An exemplary embodiment of a liquid crystal display according to the invention includes: a first substrate; and a pixel electrode disposed on the first substrate. The pixel electrode includes a first sub-pixel electrode and a second sub-pixel electrode. The first sub-pixel electrode and the second sub-pixel electrode include a cross stem, and a plurality of minute branches extending from the cross stem. The second sub-pixel electrode includes two cross stems disposed adjacent in a column direction, and a center transverse stem disposed between the two cross stems. The center transverse stem includes a cutout.

The cutout may be extended according to the center transverse stem. Two cutouts may be disposed extending from edges of the second sub-pixel electrode toward a center portion of the second sub-pixel electrode. The two cutouts may be separated from each other.

A width of the cutout may be in a range of about 3 microns (μm) to about 10 μm.

The width of the cutout may be in a range of about 4 μm to about 8 μm.

The width of the cutout may be about 6 μm.

The first and second sub-pixel electrodes may include a plurality of sub-regions having different length directions of the minute branches.

The first sub-pixel electrode may have a basic region having four sub-regions, and the second sub-pixel electrode may have two basic regions.

A ratio of a longitudinal length and a transverse length of the basic region may be in a range of about 0.76 to about 1.24.

The liquid crystal display may further include: a second substrate facing the first substrate; a common electrode disposed on the second substrate; and a liquid crystal layer between the first substrate and the second substrate. A plurality of liquid crystal molecules of the liquid crystal layer are aligned with a pretilt in the length directions of the minute branches.

The liquid crystal display may further include: a first alignment layer disposed on the first substrate; and a second alignment layer disposed on the second substrate. At least one of the first alignment layer, the second alignment layer and the liquid crystal layer includes a light-polymerized material.

According to one or more exemplary embodiments of the liquid crystal display according to the invention, two sub-pixel electrodes disposed in one pixel area each includes a cross stem and minute branches extended from the cross stem, a lower pixel electrode having a relatively large area among the two sub-pixel electrodes has two cross stems to divide the pixel electrode into two regions each having four sub-regions, a center transverse cross stem is between the two cross stems and a slit or cutout is disposed in the center transverse stem. Accordingly, by reducing a length of a longitudinal portion of the cross stem of the lower pixel electrode, the effect of the longitudinal portion of the cross stem is reduced such that texture generation near the longitudinal portion of the cross stem may be reduced. Additionally, by forming the slit in the center transverse stem, the effect of the center transverse stem is reduced such that texture generated in the center of the lower pixel may be reduced, thereby increasing the display quality. Accordingly, the visibility and the transmittance of the liquid crystal display are excellent while having a wide viewing angle and a fast response speed, and a liquid crystal display having excellent display quality may be provided by reducing texture.

BRIEF DESCRIPTION OF THE DRAWINGS

The above and other features of this disclosure will become more apparent by describing in further detail exemplary embodiments thereof with reference to the accompanying drawings, in which:

FIG. 4 is a plan view of an exemplary embodiment of a basic structure of the pixel of FIG. 2.

FIG. 5 includes views showing an exemplary embodiment of a process providing a pretilt angle to liquid crystal molecules by using prepolymers that are polymerized by light such as ultraviolet rays.

FIG. 6 is an exemplary embodiment of a pixel electrode of a LCD according to the invention.

FIG. 7A is a plan view of another exemplary embodiment of a pixel in a LCD according to the invention.

FIG. 8A to FIG. 8C are views of manufactured pixels and simulation results of experimental examples of a pixel electrode of a LCD according to the invention.

DETAILED DESCRIPTION

Figure 1:
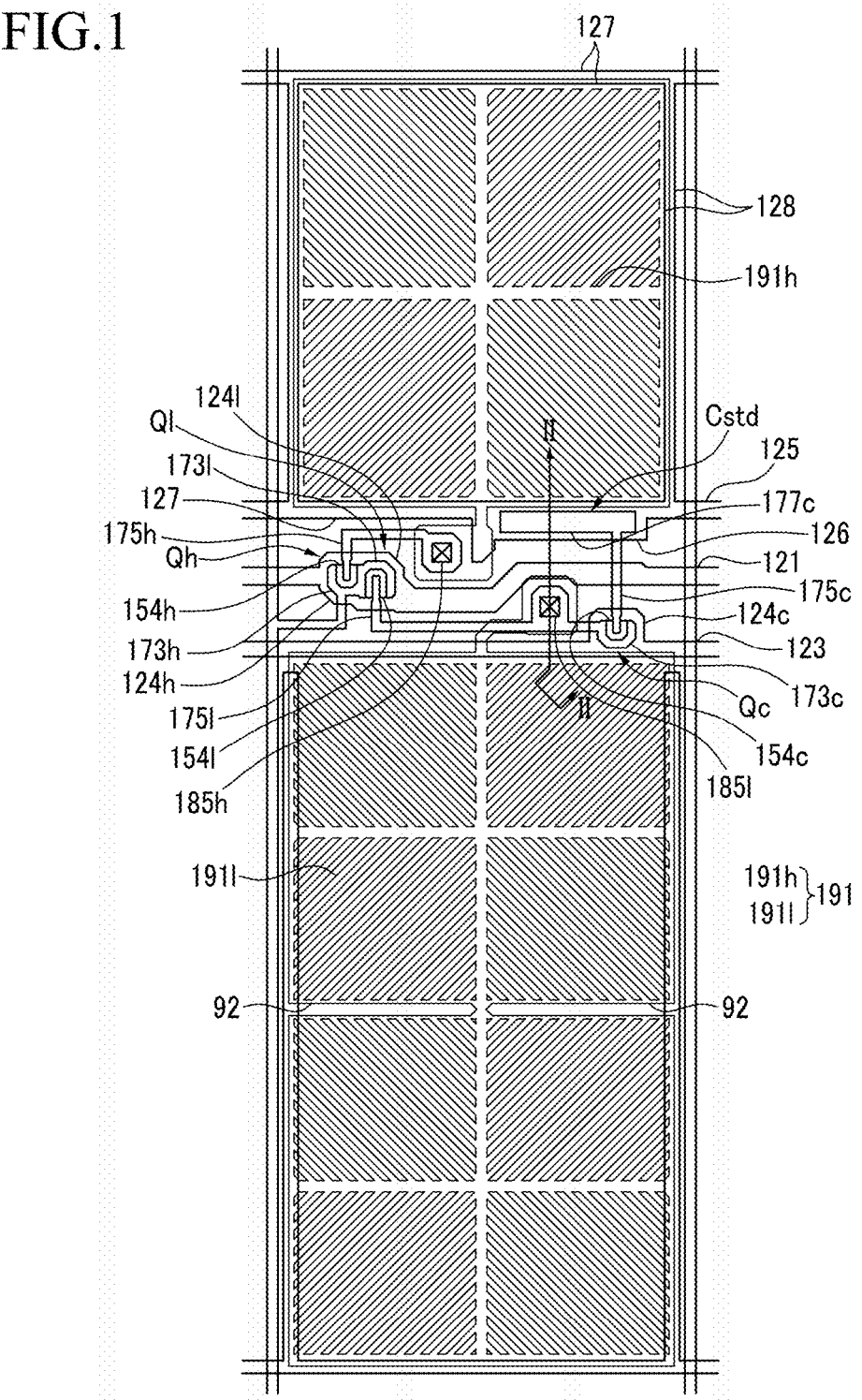
FIG. 1 is a plan view of an exemplary embodiment of a pixel in a liquid crystal display ("LCD") according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

Now, an exemplary embodiment of a display panel according to the invention will be described with reference to accompanying drawings.

Figure 2:
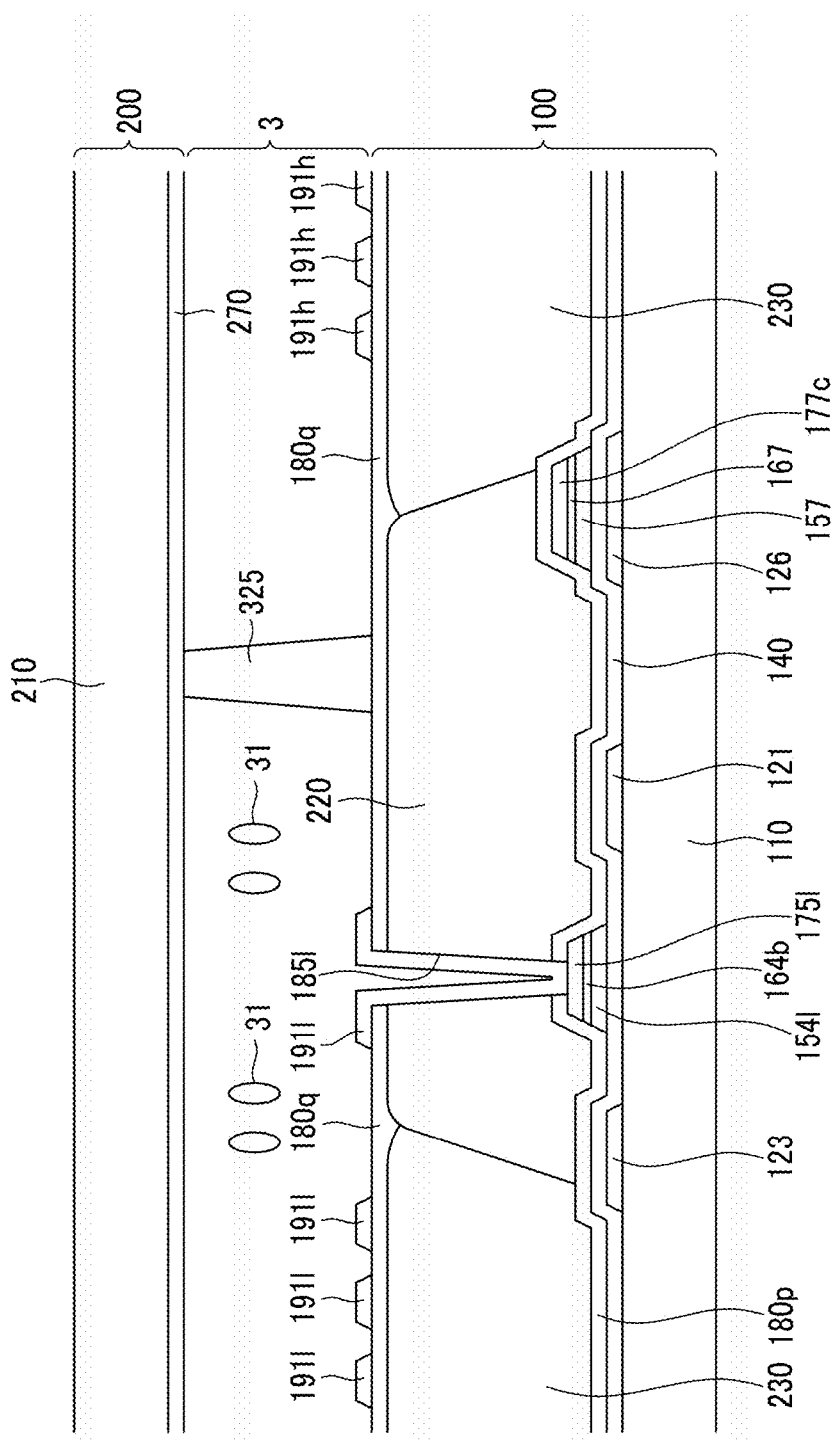
FIG. 2 is a cross-sectional view taken along line II-II of FIG. 1.

An exemplary embodiment of a liquid crystal display ("LCD") according to the invention will be described with reference to FIG. 1 to FIG. 4. FIG. 1 is a plan view of an exemplary embodiment of a pixel in an LCD according to the invention, FIG. 2 is a cross-sectional view taken along line II-II of FIG. 1, FIG. 3 is an equivalent circuit diagram of the pixel of a LCD according to the invention, and FIG. 4 is a plan view of a basic structure of the pixel of FIG. 2.

Figure 3:
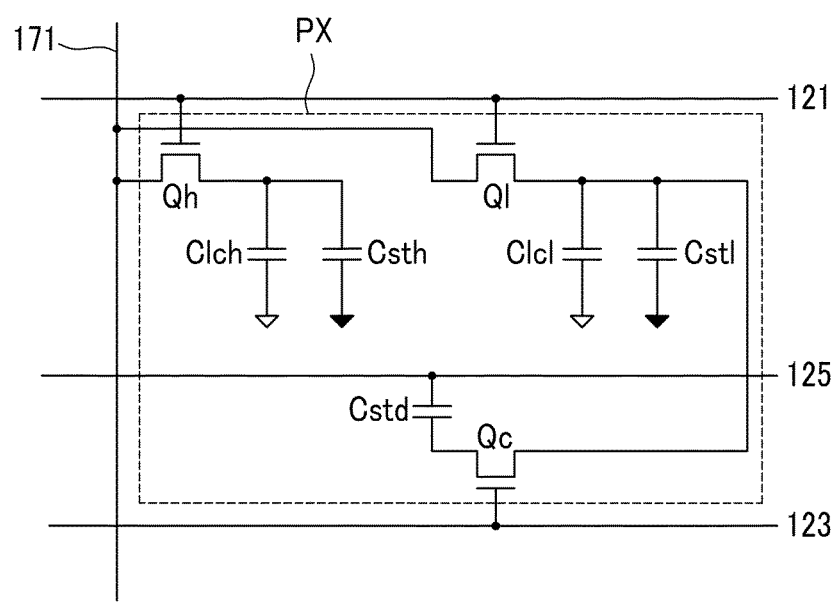
FIG. 3 is an equivalent circuit diagram of the pixel of a LCD according to the invention.

Firstly, referring to FIG. 3, an exemplary embodiment of a LCD according to the invention includes signal lines including a gate line 121, a storage electrode line 125, a step-down gate line 123 and a data line 171. A pixel PX is connected to the signal lines.

The pixel PX includes first to third switching elements Qh, Ql and Qc, first and second liquid crystal capacitors Clch and Clcl, first and second storage capacitors Csth and Cstl, and a step-down capacitor Cstd. Here, the first switching element Qh and the first thin film transistor Qh, the second switching element Ql and the second thin film transistor Ql, and the third switching element Qc and the third thin film transistor Qc are denoted by the same reference numerals.

The first and second thin film transistors Qh and Ql are respectively connected to the gate line 121 and the data line 171, and the third thin film transistor Qc is connected to the step-down gate line 123.

The first and second thin film transistors Qh and Ql as three-terminal elements provided in a lower display panel 100 (see FIG. 2) have a control terminal connected to the gate line 121, an input terminal connected to the data line 171, and an output terminal connected to the first and second liquid crystal capacitors Clch and Clcl and the first and second storage capacitors Csth and Cstl.

The third thin film transistor Qc as a three-terminal element provided in the lower display panel 100 has a control terminal connected to the step-down gate line 123, an input terminal connected to the second liquid crystal capacitor Clcl, and an output terminal connected to the step-down capacitor Cstd.

The first and second liquid crystal capacitors Clch and Clcl are formed by overlapping first and second sub-pixel electrodes 191h and 191l connected to the first and second switching elements Qh and Ql, and a common electrode 270 of an upper display panel 200, also referred to as a common electrode panel, with each other. The first and second storage capacitors Csth and Cstl are formed by overlapping the storage electrode line 125 as well as a storage electrode and the first and second sub-pixel electrodes 191h and 191l, respectively. The storage electrode will be described in detail later.

The step-down capacitor Cstd is connected to the output terminal of the third thin film transistor Qc and the storage electrode line 125. The storage electrode line 125 provided in the lower display panel 100 and the output terminal of the third thin film transistor Qc overlap each other via an insulator.

Next, an exemplary embodiment of a liquid crystal display according to the invention will be described with reference to FIG. 1 and FIG. 2.

Referring to FIG. 1 and FIG. 2, the exemplary embodiment of the LCD according to the invention includes the lower display panel 100 and the upper display panel 200 facing each other, a liquid crystal layer 3 interposed between the two display panels 100 and 200, and a pair of polarizers (not shown) attached to the outer surfaces of the display panels 100 and 200.

Now, the lower display panel 100 will be described.

A gate conductor including a plurality of gate lines 121, a plurality of step-down gate lines 123, and a plurality of storage electrode lines 125 are on an insulation substrate 110.

The gate lines 121 and the step-down gate lines 123 transfer gate signals and have a longitudinal axis that mainly extends in a transverse direction, for example, left-to-right in FIG. 1. Each gate line 121 includes a first gate electrode 124h and a second gate electrode 124l protruding upward and downward from a main portion of the gate line 121 in the plan view, and each step-down gate line 123 includes a third gate electrode 124c protruding upward from a main portion of the step-down gate line 123 in the plan view. The first gate electrode 124h and the second gate electrode 124l are continuous with and connected to each other, thereby forming one protrusion.

The storage electrode lines 125 have a longitudinal axis that are mainly extends in the transverse direction, and transfer a predetermined voltage such as a common voltage Vcom. The storage electrode line 125 includes a pair of longitudinal portions 128 having a longitudinal axis which extends upward substantially perpendicularly to the gate line 121 and in a longitudinal direction (e.g., vertically in FIG. 1), and two transverse portion 127 connecting ends of a pair of longitudinal portions 128 to each other. One of the transverse portions 127 includes a storage expansion 126 extended downward in the plan view.

A gate insulating layer 140 is on the gate conductors 121, 123 and 125.

Semiconductors 154h, 154l and 154c including hydrogenated amorphous silicon ("a-Si"), polysilicon, or so on are on the gate insulating layer 140. The semiconductors 154h, 154l and 154c include a first semiconductor 154h extending toward the first gate electrode 124h, a second semiconductor 154l extending toward the second gate electrodes 124l and a third semiconductor 154c continuous with and connected to the second semiconductor 154l. The first semiconductor 154h and the second semiconductor 154l are continuous with and connected to each other. The third semiconductor 154c is extended, thereby forming a fourth semiconductor 157.

A plurality of ohmic contacts 164b and 167 are on the semiconductors 154h, 154l and 154c. A first ohmic contact (not shown) is on the first semiconductor 154h, and a second ohmic contact 164b and a third ohmic contact (not shown) are respectively on the second semiconductor 154l and the third semiconductor 154c. The third ohmic contact is extended, thereby forming a fourth ohmic contact 167.

A data conductor including a plurality of data lines 171, a plurality of first drain electrodes 175h, a plurality of second drain electrodes 175l and a plurality of third drain electrodes 175c are on the ohmic contacts 164b and 167.

The data lines 171 transmit data signals and have a longitudinal axis which extends in the longitudinal direction thereby intersecting the gate lines 121 and the step-down gate lines 123. Each data line 171 includes a first source electrode 173h and a second source electrode 173l extending toward the first gate electrode 124h and the second gate electrode 124l, respectively.

The first drain electrode 175h, the second drain electrode 175l and the third drain electrode 175c have a first end portion having a wide planar area and a second opposing end portion of a relatively narrow and uniform width linear shape. The second bar end portions of the first drain electrode 175h and the second drain electrode 175l are partially enclosed by the first source electrode 173h and the second source electrode 173l. The wide first end portion of the second drain electrode 175l is further extended thereby forming the third source electrode 173c. An expansion 177c at the wide first end of the third drain electrode 175c overlaps the storage expansion 126 thereby forming a step-down capacitor Cstd, and the second bar end portion is partially enclosed by the third source electrode 173c.

The first, second and third gate electrodes 124h, 124l and 124c, the first, second and third source electrodes 173h, 173l and 173c, and the first, second and third drain electrodes 175h, 175l and 175c form the first, second and third thin film transistor ("TFT") Qh, Ql and Qc along with the first, second and third semiconductor 154h, 154l and 154c. A channel of the TFT Qh, Ql and Qc is respectively formed by the first, second and third semiconductor 154h, 154l and 154c between the first, second and third source electrodes 173h, 173l and 173c and the first, second and third drain electrodes 175h, 175l and 175c.

Also, the first, second and third semiconductors 154h, 154l and 154c, except for the channel region between the first, second and third source electrodes 173h, 173l and 173c and the first, second and third drain electrodes 175h, 175l and 175c, have substantially the same shape as the data conductors 171, 175h, 175l and 175c and the ohmic contacts 164l and 167 in the plan view. That is, the first, second and third semiconductors 154h, 154l and 154c have a portion that is exposed without being covered by the data conductors 171, 175h, 175l and 175c, and a portion between the first, second and third source electrodes 173h, 173l and 173c and the first, second and third drain electrodes 175h, 175l and 175c.

A lower passivation layer 180p including an inorganic insulator such as silicon nitride or silicon oxide is on the data conductors 171, 175h, 175l and 175c and the exposed semiconductors 154h, 154l and 154c.

A color filter 230 is on the lower passivation layer 180p. The color filter 230 is in most of a pixel area or pixel region except for portions including the first thin film transistor Qh, the second thin film transistor Ql and the third thin film transistor Qc. Also, each color filter 230 may have a longitudinal axis extending in the longitudinal direction between neighboring data lines 171. Each color filter 230 may display one of primary colors such as three primary colors of red, green and blue, but is not limited thereto or thereby.

A light blocking member 220 is on a region that does not include the color filter 230 and on a portion of the color filter 230. The light blocking member 220 is referred to as a black matrix, and reduces or effectively prevents light leakage. In the plan view, the light blocking member 220 is extended upward and downward according to the gate line 121 and the step-down gate line 123, and includes a first light blocking member (not shown) covering a region where the first thin film transistor Qh, the second thin film transistor Ql and the third thin film transistor Qc are disposed, and a second light blocking member (not shown) extending according to the data line 171. A spacer 325 is on the light blocking member 220. Although not shown in the drawings, a plurality of spacers 325 having different widths and or/heights may be on the light blocking member 220. In addition, the spacer 325 may include a colored photosensitive material that includes a black pigment and the like, and the colored photosensitive material may have positive photosensitivity. The spacer 325 may be tapered, having a largest cross-sectional width at a lower portion and a smallest cross-sectional width at an upper portion. In addition, the spacer 325 may include a same material as the light blocking member 220 or be in a same layer of the LCD as the light blocking member 220.

In an alternatively exemplary embodiment, according to the invention, the light blocking member 220 may be in the upper display panel 200 rather than the lower display panel 100.

An upper passivation layer 180q is on the color filter 230 and the light blocking member 220. The upper passivation layer 180q reduces or effectively prevents peeling of the color filter 230 and the light blocking member 220, and suppresses contamination of the liquid crystal layer 3 by an organic material of the solvent that flows in from the color filter 230, such that the upper passivation layer 180q reduces or effectively prevents defects such as afterimages in the LCD that may occur when an image is displayed.

The lower passivation layer 180p, the light blocking member 220 and the upper passivation layer 180q have a plurality of first contact holes 185h and a plurality of second contact holes 185l extended through thicknesses thereof, that expose the wide first end portion of the first drain electrode 175h and the wide first end portion of the second drain electrode 175l.

A plurality of pixel electrodes 191 are on the upper passivation layer 180q.

Each pixel electrode 191 includes the first sub-pixel electrode 191h and the second sub-pixel electrode 191l that are substantially separated from each other in the plan view, with two gate lines 121 and 123 therebetween. The first sub-pixel electrode 191h and the second sub-pixel electrode 191l are disposed above and beneath a virtual center line of the pixel with respect to the gate lines 121 and 123, and are adjacent in a column direction (e.g., the longitudinal direction).

The first sub-pixel electrode 191h and the second sub-pixel electrode 191l include one or more basic electrodes 199, or modifications thereof, shown in FIG. 4. In detail, the first sub-pixel electrode 191h includes one basic electrode 199, and the second sub-pixel electrode 191l includes two basic electrodes 199 that are disposed adjacent to each other in the column direction. The second sub-pixel electrode 191l has a cutout 92 between the two basic electrodes 199. The cutout 92 has a longitudinal axis that extends in the transverse direction. A width of the cutout 92 taken perpendicular to the longitudinal axis thereof, may be in a range about 3 microns (μm) to about 10 μm, in a range of about 4 μm to about 8 μm, or more than about 6 μm.

Hereinafter, referring to FIG. 4, the basic electrode 199 will be described in detail.

As shown in FIG. 4, an overall planar shape of the basic electrode 199 is quadrangular. The basic electrode 199 includes a cross-shaped stem portion that is formed of a transverse stem portion 193, and a vertical stem portion 192 that is perpendicular to the transverse stem portion 193. In addition, the basic electrode 199 is divided into a first subregion Da, a second subregion Db, a third subregion Dc and a fourth subregion Dd by the transverse stem portion 193 and the longitudinal stem portion 192. Each subregion Da-Dd includes a plurality of first to fourth minute branches 194a, 194b, 194c and 194d, respectively.

The first minute branch 194a obliquely extends from the transverse stem 193 or the longitudinal stem 192 in the upper-left direction, and the second minute branch 194b obliquely extends from the transverse stem 193 or the longitudinal stem 192 in the upper-right direction. The third minute branch 194c obliquely extends from the transverse stem 193 or the longitudinal stem 192 in the lower-left direction, and the fourth minute branch 194d obliquely extends from the transverse stem 193 or the longitudinal stem 192 in the lower-right direction.

The first to fourth minute branches 194a-194d form an angle of about 45 degrees or 135 degrees with the gate lines 121 and 123 or the transverse stem 193. Also, virtual lines of the minute branches 194a-194d of two neighboring subregions Da-Dd may be crossed, and may form an angle of about 90 degrees. The minute branches 194a-194d each have a longitudinal axis.

A width of the minute branches 194a, 194b, 194c and 194d taken perpendicular to the longitudinal axis, may be in the range of about 2.5 μm to about 5.0 μm. An interval between neighboring minute branches 194a, 194b, 194c and 194d within one subregion Da, Db, Dc and Dd and taken perpendicular to the longitudinal direction, may be in the range of about 2.5 μm to about 5.0 μm.

A ratio of a transverse length and a longitudinal length of the basic electrode 199 may be in a range of about 0.76 to about 1.24. That is, if the transverse length of the basic electrode 199 is about 1, the longitudinal length may be between about 0.76 to about 1.24.

The first sub-pixel electrode 191h and the second sub-pixel electrode 191l include a circumference stem portion that surrounds the circumference thereof. A vertical portion of the circumference stem portion extends along the data line 171 such as parallel to the data line 171, and may reduce or effectively prevent capacitive coupling between the data line 171 and the first sub-pixel electrode 191h and between the data line 171 and the second sub-pixel electrode 191l.

The first sub-pixel electrode 191h and the second sub-pixel electrode 191l receive a data voltage through the first contact hole 185h and the second contact hole 185l from the first drain electrode 175h and the second drain electrode 175l, respectively. The first sub-pixel electrode 191h and the second sub-pixel electrode 191l to which the data voltage is applied generate an electric field in conjunction with the common electrode 270 of the common electrode panel 200 to determine a direction of liquid crystal molecules 31 of the liquid crystal layer 3 between the two electrodes 191 and 270. As described above, according to the determined direction of the liquid crystal molecules 31, the luminance of light that passes through the liquid crystal layer 3 is changed.

The edges of the first to fourth minute branches 194a-194d distort the electric field, and form a horizontal component of the electric field that determines an inclined direction of liquid crystal molecules 31. The horizontal component of the electric field is substantially parallel to the edges of the first to fourth minute branches 194a-194d. Accordingly, the liquid crystal molecules 31 are inclined in the direction parallel to the longitudinal axis, e.g., length direction) of the minute branches 194a-194d. The length directions in which the minute branches 194a-194d are extended in one pixel PX may include four directions such that the inclined directions of the liquid crystal molecules 31 are in the four directions, and four domains including the different length directions of the liquid crystal molecules 31 are formed in the liquid crystal layer 3, but the invention is not limited thereto or thereby. The viewing angle of the LCD is widened by varying the inclined directions of the liquid crystal molecules 31.

The first sub-pixel electrode 191h and the common electrode 270 form the first liquid crystal capacitor Clch along with the liquid crystal layer 3 interposed therebetween, and the second sub-pixel electrode 191l and the common electrode 270 form the second liquid crystal capacitor Clcl along with the liquid crystal layer 3 interposed therebetween, thereby maintaining the voltage after the first and second thin film transistors Qh and Ql are turned off.

The first and second sub-pixel electrodes 191h and 191l overlap the storage electrode line 125 as well as the storage electrode thereby forming the first and second storage capacitors Csth and Cstl, and the first and second storage capacitors Csth and Cstl enhance the voltage storage capacity of the first and second liquid crystal capacitors Clch and Clcl.

The storage expansion 126 of the storage electrode line 125 and the expansion 177c of the third drain electrode 175c overlap each other via the gate insulating layer 140 and the semiconductor layers 157 and 167, thereby forming the step-down capacitor Cstd. In another exemplary embodiment of the invention, the semiconductor layers 157 and 167 may be omitted between the storage expansion 126 of the storage electrode line 125 and the expansion 177c of the third drain electrode 175c to form the step-down capacitor Cstd.

The lower alignment layer (not shown) is on the pixel electrode 191 and the exposed upper passivation layer 180q. The lower alignment layer may be a vertical alignment layer and may include the photo-reactive material.

Next, the common electrode panel 200 will be described.

The common electrode 270 is on an insulation substrate 210. An upper alignment layer (not shown) is on the common electrode 270. The upper alignment layer may be a vertical alignment layer and may include a light-polymerized member.

A polarizer (not shown) may be provided on the outer surface of the two display panels 100 and 200. The transmissive axes of the two polarizers may be orthogonal to each other and any one transmissive axis of the transmissive axes is parallel to the gate line 121.

Another exemplary embodiment of a LCD according to the invention may further include a circular polarizer.

The liquid crystal layer 3 has negative dielectric anisotropy, and the liquid crystal molecules 31 of the liquid crystal layer 3 may be aligned so that long axes thereof are vertical or perpendicular with respect to the surface of the two display panels 100 and 200 in a state in which there is no electric field. Therefore, light incident to the display panels 100 and 200 does not pass through the crossed polarizers but is blocked in a state in which there is no electric field.

At least one of the lower alignment layer, the upper alignment layer and the liquid crystal layer may include a light-polymerized material.

As described above, since the first sub-pixel electrode 191h and the second sub-pixel electrode 191l to which the data voltage is applied generate an electric field in conjunction with the common electrode 270 of the common electrode panel 200, the liquid crystal molecules 31 of the liquid crystal layer 3, which are aligned vertically with respect to the surfaces of the two electrodes 191 and 270 in a state in which there is no electric field, lie in a horizontal direction with respect to the surfaces of the two electrodes 191 and 270, and the luminance of light that passes through the liquid crystal layer 3 is changed according to the degree of tilt of the liquid crystal molecules 31.

Next, an exemplary embodiment of a driving method of the liquid crystal display shown in FIG. 1 and FIG. 2 will be described with reference to FIG. 3 as well as FIG. 1 and FIG. 2.

If the gate line 121 is applied with a gate-on signal, the first switching element Qh and the second switching element Ql connected thereto are turned on. Accordingly, the data voltage applied to the data line 171 is applied to the first sub-pixel electrode 191h and the second sub-pixel electrode 191l through the turned on first switching element Qh and second switching element Ql. At this time, the data voltages applied to the first sub-pixel electrode 191h and the second sub-pixel electrode 191l have the same magnitude. Accordingly, the voltages charged to the first and second liquid crystal capacitors Clch and Clcl are the same.

If the gate line 121 is applied with a gate-off signal and the step-down gate line 123 is applied with the gate-on signal, the first switching element Qh and the second switching element Ql are turned off and the third switching element Qc is turned on. Thus, the charge is moved from the second sub-pixel electrode 191l to the step-down capacitor Cstd through the third switching element Qc. Therefore, the charged voltage of the second liquid crystal capacitor Clcl is decreased and the step-down capacitor Cstd is charged. The charge voltage of the second liquid crystal capacitor Clcl is decreased by the capacitance of the step-down capacitor Cstd such that the charge voltage of the second liquid crystal capacitor Clcl is lower than the charge voltage of the first liquid crystal capacitor Clch.

At this time, the charged voltages of two liquid crystal capacitors Clch and Clcl represent different gamma curves, and the gamma curve of one pixel voltage is a combination curve of the different gamma curves. A front side combination gamma curve coincides with a reference gamma curve at the optimally-determined front side of the LCD, and a lateral gamma curve approximates the front reference gamma curve. In this way, the image data are converted so that the lateral visibility of the LCD is improved.

Next, an exemplary embodiment of an initial alignment method for providing the pretilt to the liquid crystal molecules 31 of the liquid crystal layer 3 will be described with reference to FIG. 5. FIG. 5 includes views showing a process of providing a pretilt angle to liquid crystal molecules 31 by using prepolymers that are polarized by light such as ultraviolet rays.

Referring to the first view in FIG. 5, prepolymers 330 such as a monomer that is polymerized by light such as ultraviolet rays are injected along with a liquid crystal material between the two display panels 100 and 200. In one exemplary embodiment, the prepolymer 330 may be included in an alignment layer (not shown) on the two display panels 100 and 200 as well as in liquid crystal layer 3. The prepolymer 330 may be a reactive mesogen that is polymerized by light such as ultraviolet rays.

Referring to the second view in FIG. 5, voltages are applied to the gate lines and the data lines that are on the lower display panel 100 to apply the data voltage to the first and second sub-pixel electrodes, and a common voltage is applied to the common electrode of the upper display panel 200, thereby forming the electric field to the liquid crystal layer 3 between the two display panels 100 and 200.

In response to the electric field, the liquid crystal molecules 31 of the liquid crystal layer 3 are tilted in the direction parallel to the length direction of the minute branches 194a-194d through two steps, and the inclined directions of the liquid crystal molecules 31 in one pixel PX are four directions.

After generating the electric field to the liquid crystal layer 3, if the light such as ultraviolet rays is irradiated, the prepolymers 330 are polymerized to form a polymer 370.

The polymer 370 may be formed contacting the display panels 100 and 200. The alignment direction is determined for the liquid crystal molecules 31 to have the pretilt in the length direction of the minute branches 194a-194d by the polymer 370.

Accordingly, the liquid crystal molecules 31 are arranged with the pretilts of four different directions under non-application of the voltage to the electrodes 191 and 270, as shown in the last view of FIG. 5.

In this way, in an exemplary embodiment of the invention, the liquid crystal layer 3 of the LCD is initially aligned through the irradiation of the light under the application of the voltage to the two display panels 100 and 200.

Next, referring to FIG. 6, an exemplary embodiment of the pixel electrode 191 of the LCD according to the invention will be described.

Referring to FIG. 6, the first sub-pixel electrode 191h of the pixel electrode 191 includes a first cross stem including a first transverse stem 193a, and a first longitudinal stem 192a crossing the first transverse stem 193a. Also, the first sub-pixel electrode 191h includes a plurality of first minute branches 194e extending from the first longitudinal stem 192a in a plurality of directions.

The second sub-pixel electrode 191l of the pixel electrode 191 includes a second cross stem including a second transverse stem 193b and a second longitudinal stem 192b, and a third cross stem including a third transverse stem 193c and a third longitudinal stem 192c. The second cross stem and the third cross stem are disposed to be adjacent in the vertical direction. Also, the second sub-pixel electrode 191l includes a plurality of second minute branches 194f and a plurality of third minute branches 194g extending in a plurality of directions from the second cross stem and the third cross stem.

In this way, each sub-pixel electrode 191h and 191l includes a basic region having four domains divided with reference to the respective cross stem. As described above, the first sub-pixel electrode 191h includes one basic region having four domains, and the second sub-pixel electrode 191l includes two basic regions each having four domains.

Here, a ratio of a transverse length and a longitudinal length of each basic region may be in a range of about 0.76 to about 1.24. That is, if the transverse length of the basic region is about 1, the longitudinal length may be between about 0.76 to about 1.24.

The second sub-pixel electrode 191l having a relatively large planar area includes two cross stems and a plurality of minute branches extended therefrom, compared with a case of forming one cross stem and a plurality of minute branches extended therefrom in the same planar area. Thereby, the length of the transverse and longitudinal stems of the cross stem may be relatively short. Accordingly, an influence of the longitudinal stem may be reduced since the longitudinal stem is relatively shorter, thereby reducing a texture generated near the longitudinal stem.

Also, the cutout 92 is in a center transverse stem 195 disposed between the two cross stems of the second sub-pixel electrode 191l. The center transverse stem 195 connects the two cross stems to each other, such that the second sub-pixel electrode 191l may be a single, unitary, indivisible member. The cutout 92 is recessed in from right and/or left outer edges of the second sub-pixel electrode 191l and toward a center portion of the second sub-pixel electrode 191l. The center transverse stem 195 includes two cutouts 92 separated from each other at the center portion of the second sub-pixel electrode.

The width of the cutout 92 may be in a range about 3 μm to about 10 μm, in a range of about 4 μm to about 8 μm, or may be more than about 6 μm.

The cutout 92 reduces the influence of the center transverse stem 195 disposed at the center portion of the second sub-pixel electrode 191l, thereby reducing the texture generated near the center transverse stem 195 of the second sub-pixel electrode 191l.

Figure 7B:
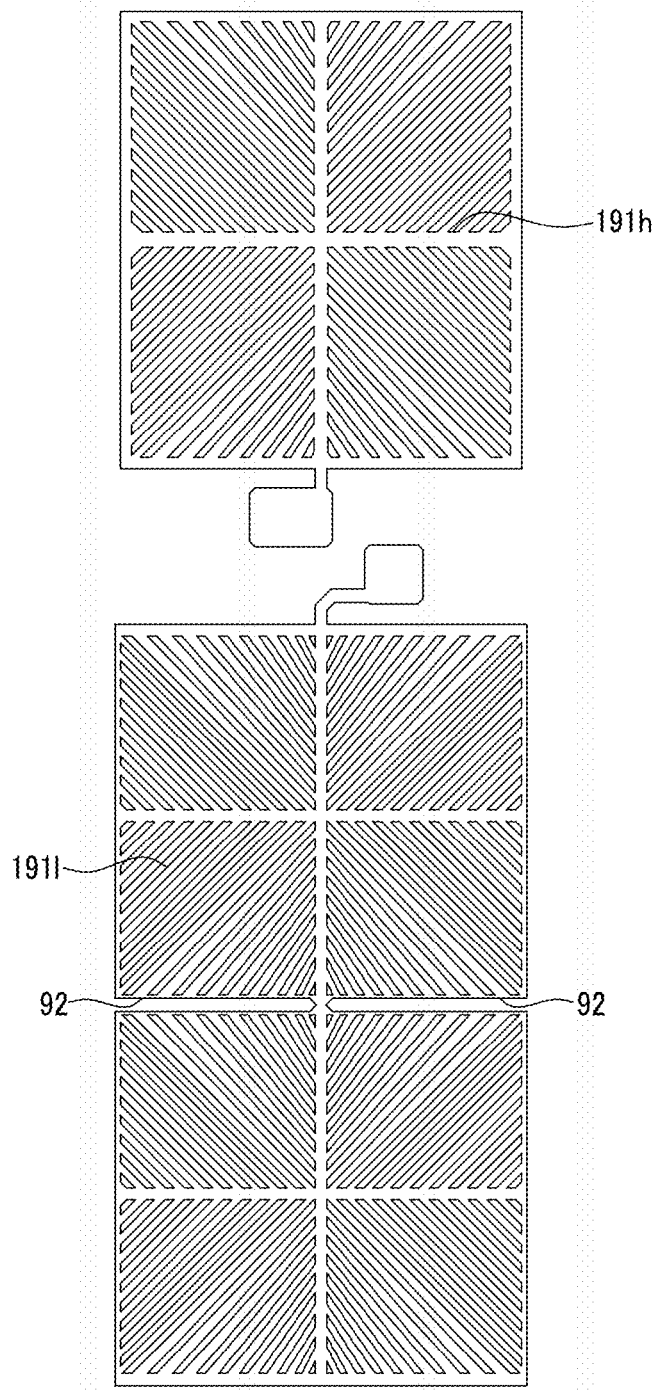
FIG. 7B is another exemplary embodiment of a pixel electrode of a LCD according to the invention.

Next, referring to FIG. 7A and FIG. 7B, another exemplary embodiment of a LCD according to the invention will be described. FIG. 7A is a plan view of another exemplary embodiment of a pixel in an LCD according to the invention, and FIG. 7B is another exemplary embodiment of a pixel electrode of a LCD according to the invention.

Referring to FIG. 7A and FIG. 7B, the exemplary embodiment of a LCD is substantially the same as the LCD shown in FIG. 1. The detailed description of the same constituent elements is omitted.

Different from the exemplary embodiment of a LCD of FIG. 1, in the exemplary embodiment of a LCD shown in FIGS. 7A and 7B, the width of the minute branches extending from each cross stem of the pixel electrode 191 is increased closer to the edge of the pixel electrode 191. A difference between the widest width and the narrowest width for one minute branch may be in a range of about 0.2 μm to 1.5 μm.

As described above, if the width of the minute branches is changed, the influence of the fringe field applied to the liquid crystal molecules 31 of the liquid crystal layer 3 is varied in each domain, thereby increasing the aperture ratio, and as a result the aperture ratio may be increased while forming a plurality of domains.

Next, with reference to FIG. 8A to FIG. 18, experimental examples according to the invention will be described.

FIG. 8A to FIG. 8C are views of manufactured pixels and a simulation results of experimental examples of a pixel electrode of a LCD according to the invention.

In the conventional art, when forming the pixel electrode of the same size as the second sub-pixel electrode 191*l*, one basic region having four domains is formed. In the experimental examples, a Case A represents removing the longitudinal stem of the pixel electrode, a Case B represents removing both the transverse stem and the longitudinal stem of the pixel electrode, and a Case C represents removing the transverse stem of the pixel electrode, while other conditions are all the same. The transmittance of the pixel area shown in the experimental examples was measured and represented by an electron microscope. The result of Case A is shown in FIG. 8A, the result of Case B is shown in FIG. 8B, and the result of Case C is shown in FIG. 8C. In FIG. 8A and FIG. 8B, (a) is an actual manufactured pixel, and (b) is a simulation result.

Referring to FIG. 8A, in the Case A representing removing the longitudinal stem, the texture is well controlled near the transverse stem, however, the texture is still generated along a longitudinal line portion.

Referring to FIG. 8B, in the Case B representing removing the transverse stem and the longitudinal stem, like the Case A representing removing the longitudinal stem, the texture is well controlled near the transverse stem, however the texture is still generated along the longitudinal line portion.

In contrast, referring to FIG. 8C, in the Case C representing removing the transverse stem, compared with the Case A representing removing the longitudinal stem and the Case B representing removing the transverse stem and the longitudinal stem, the generation of the texture is largely reduced.

In one or more exemplary embodiment of the LCD according to the invention, by forming the cutout 92 in the center transverse stem 195, the influence of the center transverse stem 195 may be reduced such that the generation of the texture may be reduced.

Next, other experimental examples according to the invention will be described with reference to FIG. 9 to FIG. 12.

Figure 9:
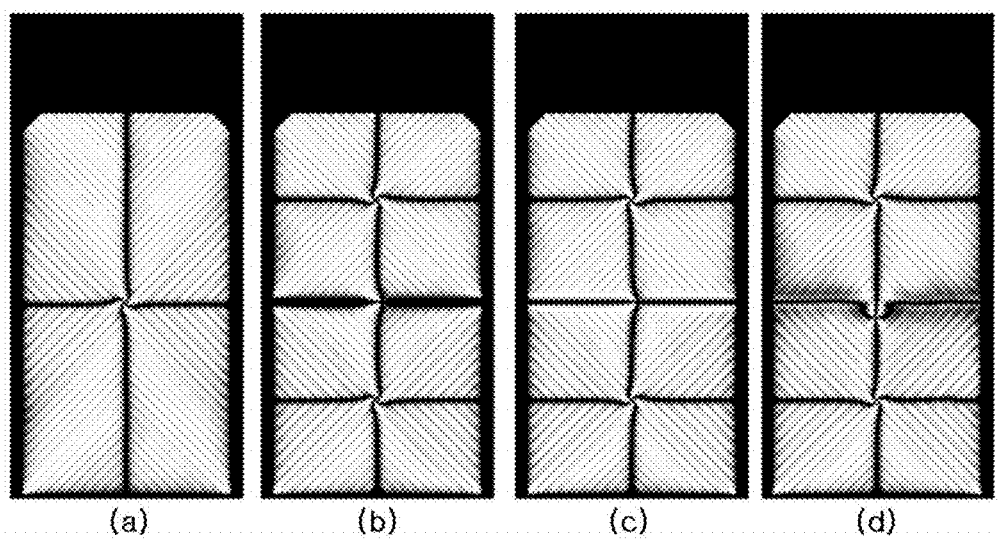
FIG. 9 includes views of simulation results of other experimental examples of a LCD according to the invention.
Figure 10:
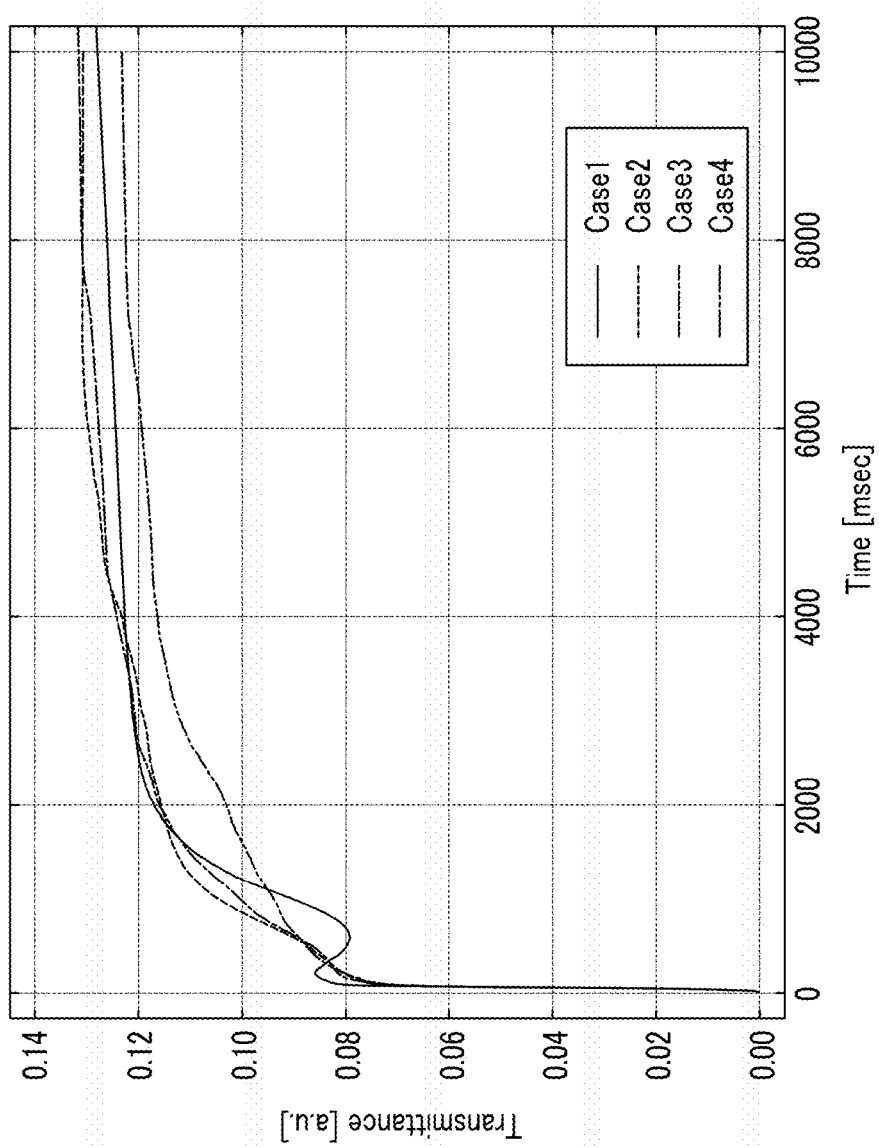
FIG. 10 is a graph of a transmittance result of other experimental examples of a LCD according to the invention.
Figure 11:
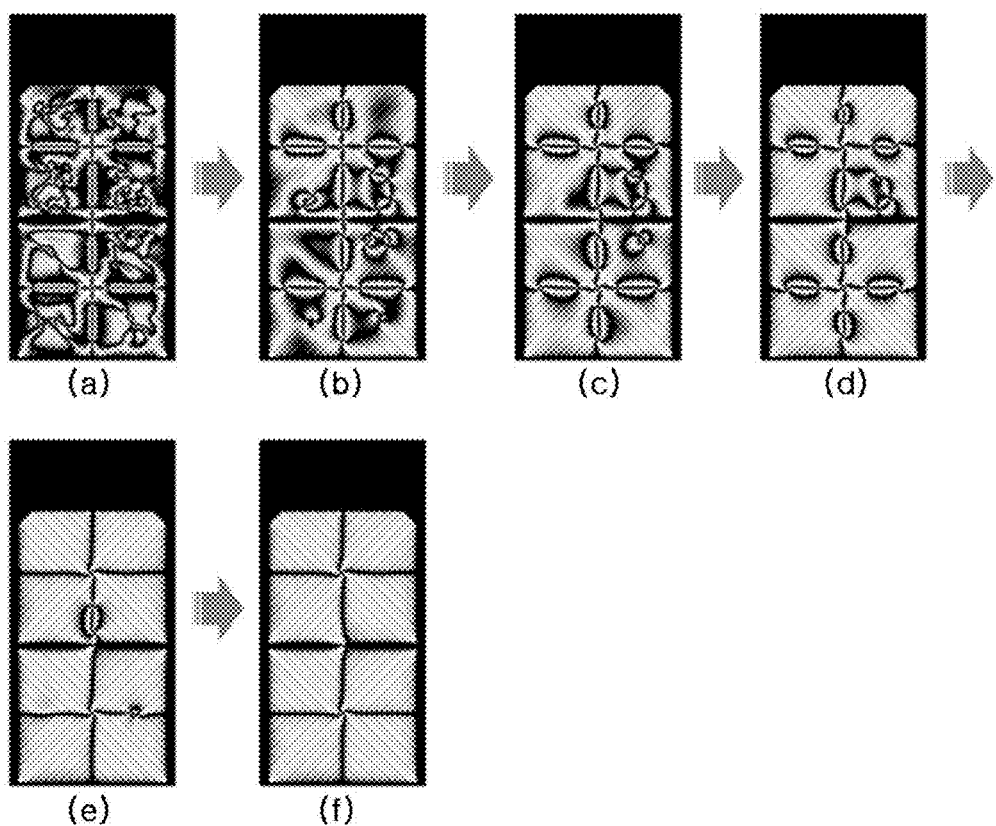
FIG. 11 includes views of simulation results of other experimental examples of a LCD according to the invention.

FIG. 9 includes views of simulation results of other experimental examples of a LCD according to the invention, and FIG. 10 is a graph of a transmittance result of other experimental examples of a LCD according to the invention. FIG. 11 includes views of simulation results of other experimental examples of a LCD according to the invention, and FIG. 12 includes views of simulation results of other experimental examples of a LCD according to the invention.

In the experimental examples of FIG. 9 to FIG. 12, conditions are all the same, and like the conventional art, the second sub-pixel electrode 191*l* is formed to include a basic region including four domains, however, the transverse stem includes the cutout. In Case 1, one basic region having four domains is formed, a cutout 92 is formed in the center transverse stem like in exemplary embodiments of the LCD according to the invention, and the width of the cutout is about 7.2 μm. In Cases 2, 3 and 4 two basic regions are formed having four domains. In addition, in Case 2, the width of the cutout 92 is about 7.9 μm, in Case 3 the width of the cutout 92 is about 6 μm, and in Case 4 the width of the cutout 92 is about 4.0 μm. The transmittance of the pixel area is measured and represented by an electron microscope.

The result of Case 1 is shown in FIG. 9 (*a*), the result of Case 2 is shown in FIG. 9 (*b*), the result of Case 3 is shown in FIG. 9 (*c*), and the result of Case 4 is shown in FIG. 9 (*d*). Here, after the liquid crystal molecules are affected by the electric field and are arranged, the result of Case 1 is after a passage of about 24,000 milliseconds (ms) after the electric field is applied to the liquid crystal layer, the result of Case 2 is after the passage of about 10,000 ms, the result of Case 3 is after the passage of about 20,000 ms, and the result of Case 4 is after passage of about 20,000 ms. Also, a transmittance change graph is shown in FIG. 10. The y-axis represents transmittance in arbitrary units (a.u.) and the x-axis represents time in milliseconds (ms).

Referring to FIG. 9, like in one or more exemplary embodiment of the LCD according to the invention, when the center transverse stem disposed at the center portion of the second sub-pixel electrode 191*l* includes the cutout 92 and the width of the cutout is in the range of about 3 μm to about 10 μm, in detail, about 4 μm to about 8 μm, texture is not generated near the center transverse stem, and the liquid crystal molecules of the liquid crystal layer are affected and arranged by the electric field in a relatively fast time. In the result of FIG. 9 (*a*), the liquid crystal molecules respond to the electric field only after the passage of about 24,000 ms after the electric field is applied to the liquid crystal layer in Case 1 such that the liquid crystal molecules are arranged to have the four domains. In contrast, in the result of FIG. 9 (*b*) to FIG. 9 (*d*), in an exemplary embodiment of the pixel electrode of a LCD according to the invention (Case 2, Case 3 and Case 4) compared with Case 1, the liquid crystal molecules respond and are arranged by the electric field in a short time to have four domains in each basic region. As described referring to FIG. 8A to FIG. 8C, in Case 1, where the center transverse stem does not include the cutout 92, texture is generated near the center stem in Case 1 such that the transmittance is reduced.

Also, referring to FIG. 10, where an exemplary embodiment of a LCD according to the invention includes two basic regions having four domains and the center transverse stem includes the cutout 92 (Case 2 and Case 3, for example), compared with Case 1 of a pixel electrode including one basic region having four domains, the transmittance may be further increased. In Case 1, if the cutout is not formed in the center transverse stem, the transmittance difference may be large. In one or more exemplary embodiment of a LCD according to the invention, compared with a conventional liquid crystal display, the texture may be removed while increasing the transmittance.

Figure 12:
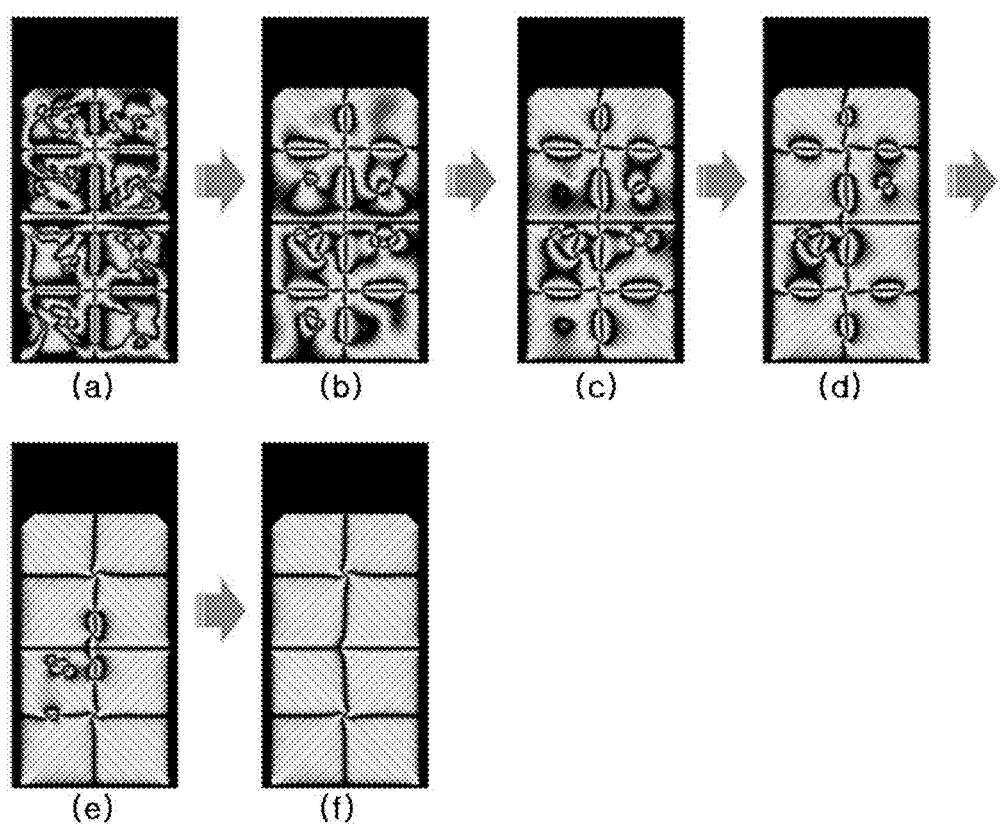
FIG. 12 includes views of simulation results of other experimental examples of a LCD according to the invention.

In the illustrated experimental examples, the transmittance change according to time for Case 2 is shown in FIG. 11, and transmittance change according to time for Case 3 is shown in FIG. 12.

In FIG. 11 and FIG. 12, (a) is a case that the voltage of about 4 volts (V) is applied to the liquid crystal layer and after the time of about 100 ms has passed, (b) is the case after the time of about 500 ms has passed, (c) is the case after the time of about 1,000 ms has passed, (d) is the case after the time of about 2,000 ms has passed, (e) is the case after the time of about 5,000 ms has passed, and (f) is the case after the time of about 9,000 ms has passed.

In two cases, it may be confirmed that the texture that may be generated near the transverse stem and the longitudinal stem is not generated. Particularly, if the time of about 9,000 ms has passed (case f in FIG. 11 and FIG. 12), the liquid crystal molecules of the liquid crystal layer are well arranged while forming four domains in each basic region. That is, an exemplary embodiment of a pixel electrode in a LCD according to the invention (Case 2, Case 3 and Case 4) compared with Case 1, the liquid crystal molecules respond to the electric field in a short time thereby being arranged to having four domains in a basic region.

Next, other experimental examples according to the invention will be described with reference to FIG. 13 to FIG. 15.

Figure 13:
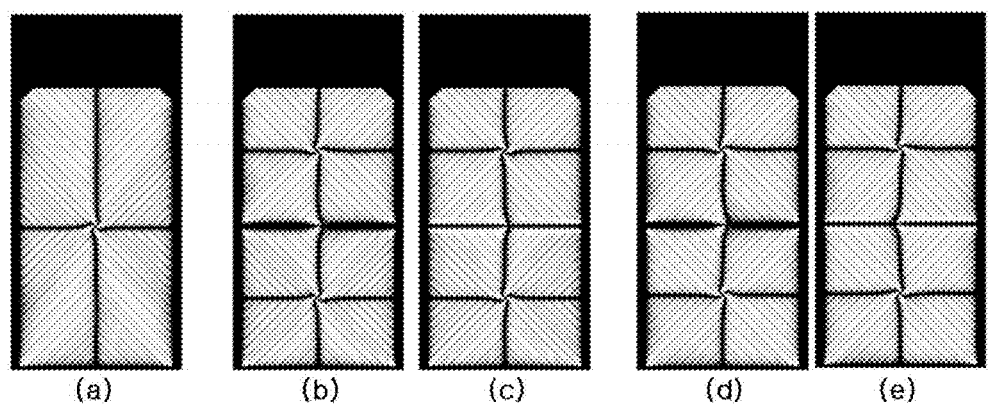
FIG. 13 includes views of simulation results of other experimental examples of a LCD according to the invention.
Figure 14:
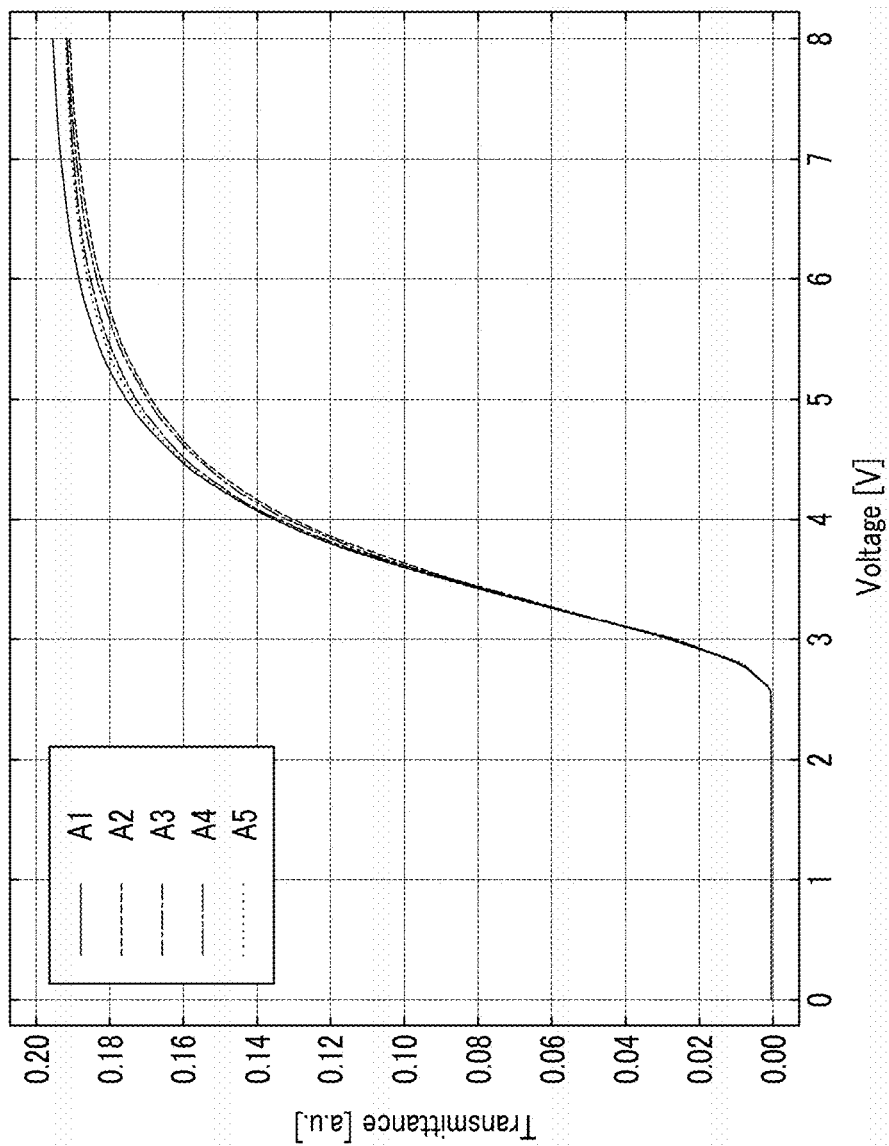
FIG. 14 is a graph of a transmittance result of other experimental examples of a LCD according to the invention.
Figure 15:
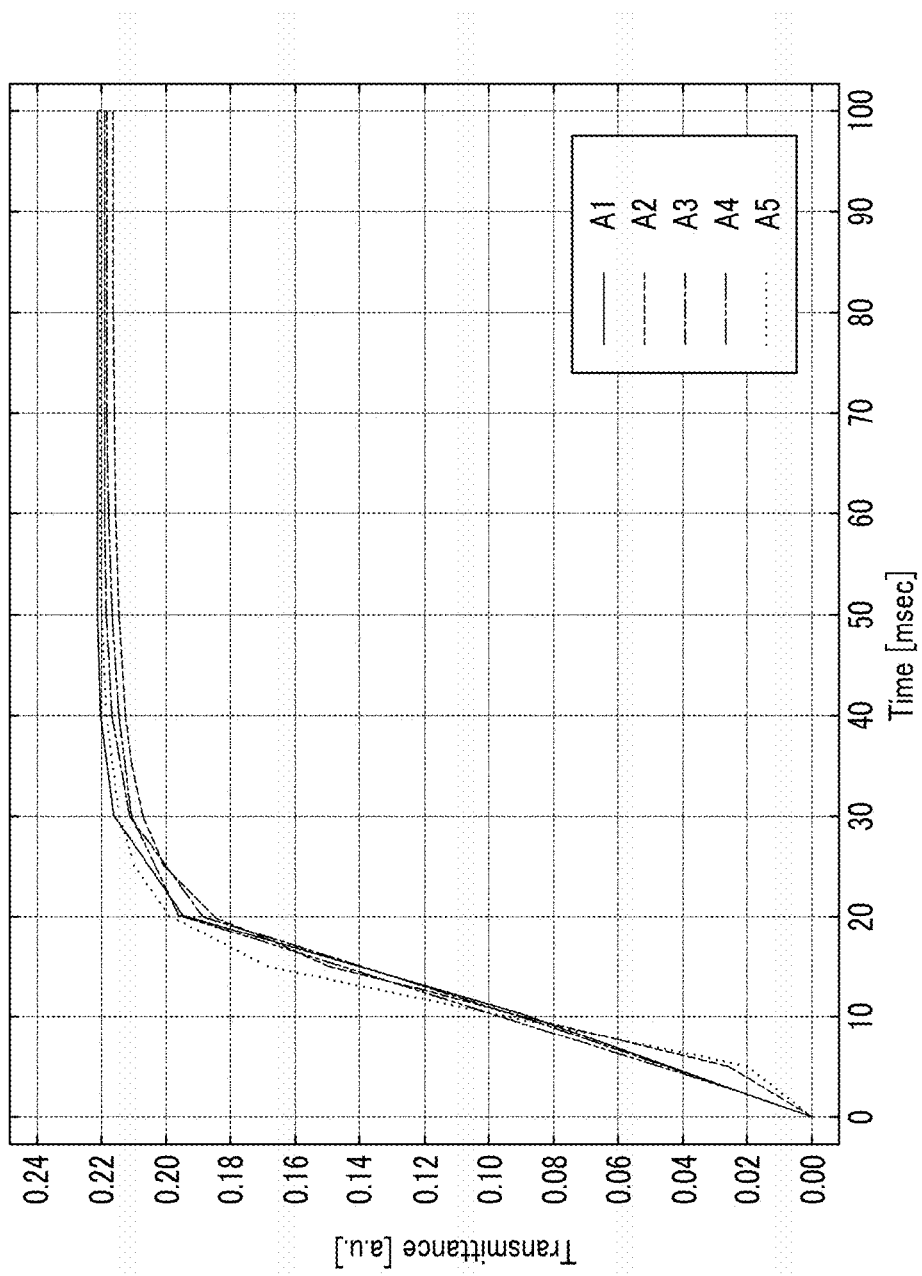
FIG. 15 is a graph of a transmittance result of other experimental examples of a LCD according to the invention.

FIG. 13 includes views of simulation results of other experimental examples of a LCD according to the invention, FIG. 14 is a graph of a transmittance result of other experimental examples of a LCD according to the invention, and FIG. 15 is a graph of a transmittance result of other experimental examples of a LCD according to the invention.

In the experimental examples of FIG. 13 to FIG. 15, the conditions are all the same and the shape of the pixel electrode is changed. In detail, like the conventional art, in Case A1 the second sub-pixel electrode 191*l* includes one basic region having four domains, however, the transverse stem further includes the cutout with the width of about 7.2 μm. Like in exemplary embodiments of the LCD according to the invention, the second sub-pixel electrode 191*l* includes two basic regions having four domains and the center transverse stem 195 includes the cutout 92. In Case A2, the width of the cutout 92 is about 7.9 μm and the width of the minute branches of the pixel electrode is increased closer to the edge of the pixel electrode. In Case A3, the width of the cutout 92 is about 6.0 μm and the width of the branches of the pixel electrode is increased closer to the edge of the pixel electrode. In Case A4, the width of the cutout 92 is about 7.9 μm, and in Case A5, the width of the cutout 92 is about 6.0 μm, the width of the branches of the pixel electrode being increased closer to the edge of the pixel electrode. The transmittance of each pixel area is measured and represented by an electron microscope.

The result of Case A1 is represented in FIG. 13 (*a*), the result of case A2 is represented in FIG. 13 (*b*), the result of case A3 is represented in FIG. 13 (*c*), the result of case A4 is represented in FIG. 13 (*d*), and the result of Case A5 is represented in FIG. 13 (*e*). Here, after the liquid crystal molecules are affected by the electric field and arranged, the result of Case A1 is after the passage of about 24,000 ms after the liquid crystal layer is applied with the electric field, the result of Case A2 is after the passage of about 10,000 ms, the result of Case A3 is after the passage of about 20,000 ms, and the results of Case A4 and Case A5 are after the passage of about 9,000 ms. The transmittance according to voltage is shown in FIG. 14. The y-axis represents transmittance in arbitrary units (a.u.) and the x-axis represents voltage in volts (V). The transmittance according to time is shown in FIG. 15. The y-axis represents transmittance in arbitrary units (a.u.) and the x-axis represents time in milliseconds (ms). FIG. 15 is a case in which the liquid crystal layer is applied with a voltage of about 10 V.

Referring to FIG. 13, like in one or more exemplary embodiment of the LCD according to the invention, when the center transverse stem disposed at the center portion of the second sub-pixel electrode 191*l* includes the cutout 92 and the width of the cutout is in the range of about 3 μm to about 10 μm, in detail, about 4 μm to about 8 μm, texture is not generated near the center transverse stem, and the liquid crystal molecules of the liquid crystal layer are affected and arranged by the electric field in a relatively fast time. In the result of FIG. 13 (*a*), the liquid crystal molecules respond to the electric field only after the passage of about 24,000 ms after the electric field is applied to the liquid crystal layer in Case A1 such that they are arranged to have the four domains. In contrast, in the results of FIG. 13 (*b*) to FIG. 13 (*e*), in an exemplary embodiment of the pixel electrode of a LCD according to the invention (Case A2, Case A3, Case A4 and Case A5) compared with Case A1, the liquid crystal molecules respond and are arranged by the electric field in a short time to have four domains in each basic region.

Furthermore, compared with FIG. 13 (*b*) and FIG. 13 (*c*), and FIG. 13 (*d*) and FIG. 13 (*e*), although the width of the minute branches of the pixel electrode is not increased closer to the edge of the pixel electrode in FIG. 13 (*a*) and is formed to be a constant width, the liquid crystal molecules respond to the electric field in a short time, thereby being arranged to have four domains.

Referring to FIG. 14, in the cases (Case A2, Case A3, Case A4, and Case A5) of an exemplary embodiment of the pixel electrode in a LCD according to the invention compared with Case A1, the transmittance is substantially the same or better according to the voltage change applied to the liquid crystal layer. Particularly, for Case A4 and Case A5 compared with Case A1, the transmittance is better according to the voltage change.

Referring to FIG. 15, for Case A2, Case A3, Case A4, and Case A5 of an exemplary embodiment of the pixel electrode in a LCD according to the invention compared with Case A1, the response speed of the liquid crystal molecules of the liquid crystal layer is substantially the same or better. Particularly, for Case A4 and Case A5 compared with Case A1, a time having the highest transmittance is relatively short such that the response speed of the liquid crystal molecules of the liquid crystal layer is fast.

Next, other experimental examples according to the invention will be described with reference to FIG. 16 and FIG. 17.

Figure 16:
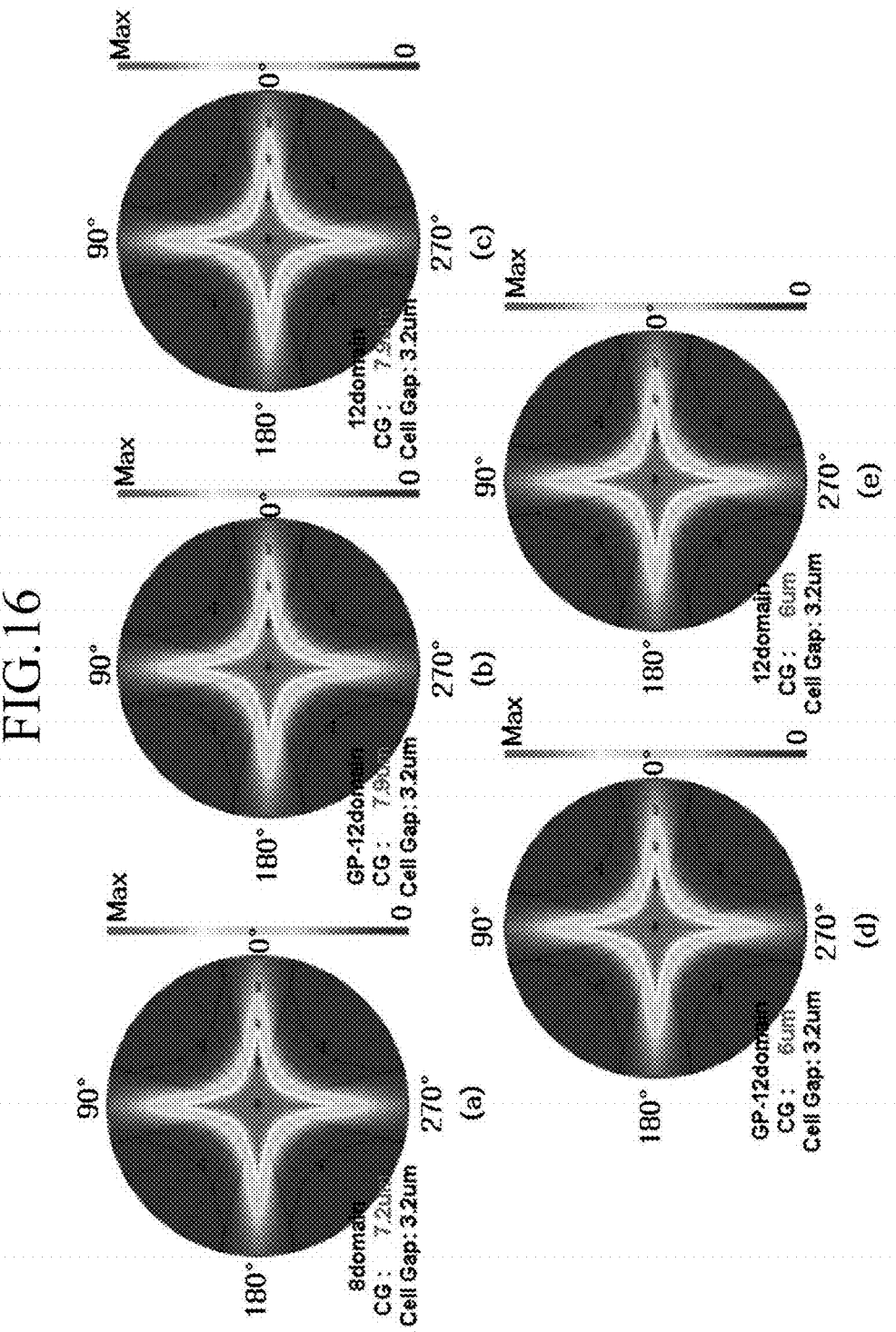
FIG. 16 includes views of simulation results of other experimental examples of a LCD according to the invention.
Figure 17:
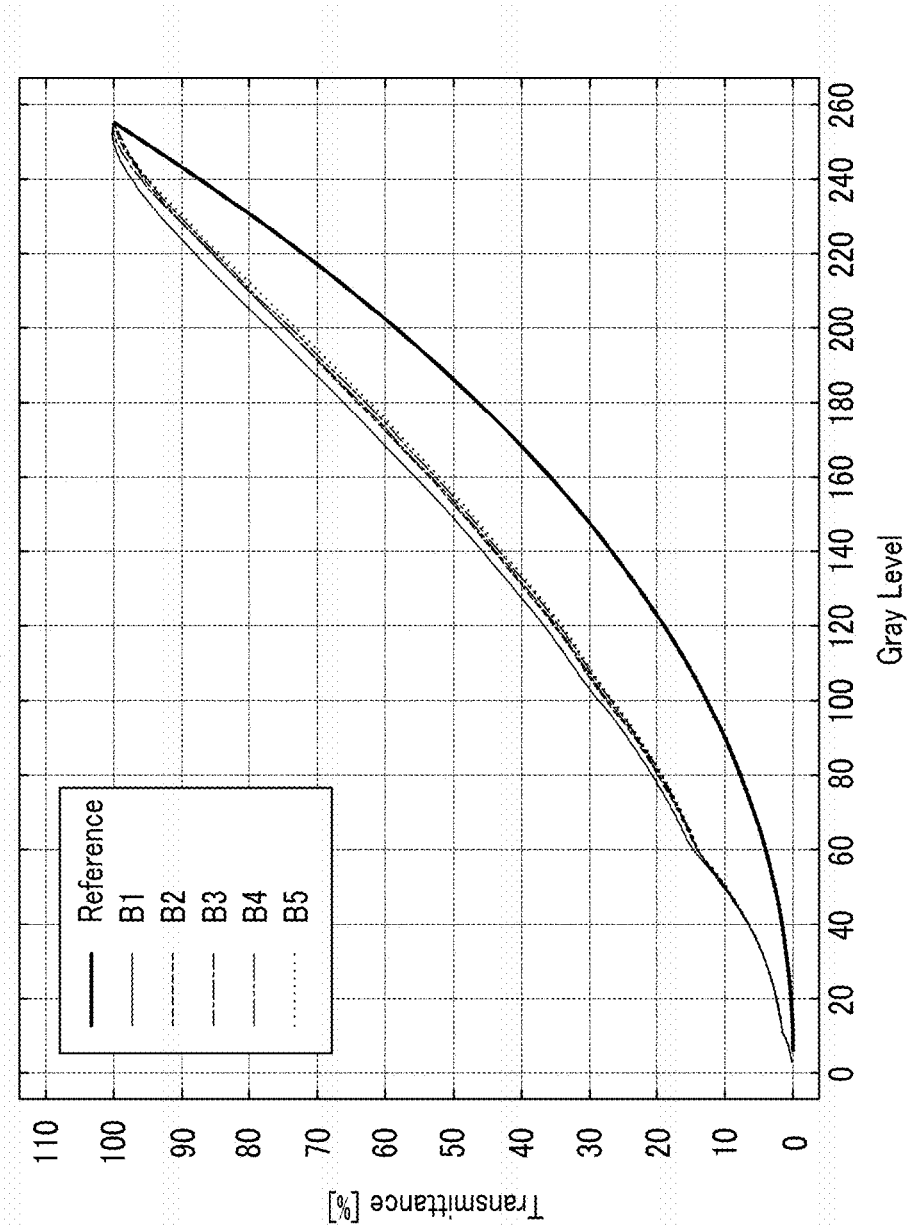
FIG. 17 is a graph of a transmittance result of other experimental examples of a LCD according to the invention.

FIG. 16 includes views of simulation results of other experimental examples of a LCD according to the invention, and FIG. 17 is a graph of a contrast ratio results of other experimental examples of a a LCD according to the invention.

In the experimental examples, the different conditions are the same and the shape of the pixel electrode is changed.

In detail, like the conventional art, for Case B1, the second sub-pixel electrode 191*l* includes one basic region having four domains, however, the center transverse stem further includes the cutout with the width of about 7.2 μm. An exemplary embodiment of the pixel electrode according to the invention in Cases B2, B3, B4 and B5, includes two basic regions having four domains and the center transverse stem 195 includes the cutout 92. In Case B2, the width of the cutout 92 is about 7.9 μm, and in Case B3 the width of the cutout 92 is about 6.0 μm. In Case B4, the width of the cutout 92 is about 7.9 μm and the width of the minute branches of the pixel electrode is increased closer to the edge of the pixel electrode, and in Case B5, the width of the cutout 92 is about 6.0 μm and the width of the branches of the pixel electrode is increased closer to the edge of the pixel electrode. For these cases, the contrast ratio according to a position of the pixel area is measured. The results thereof are shown in FIG. 16. Also, for Case B1, Case B2, Case B3, Case B4 and Case B5, the transmittance change according to a grey level in the position (an azimuth angle of 45 degrees and a polar angle of 60 degrees) is measured, and the results thereof are shown in FIG. 17. The y-axis represents transmittance in percent (%) and the x-axis represents gray level.

Referring to FIG. 17, for Case B2, Case B3, Case B4 and Case B5 of the exemplary embodiment of the pixel electrode in the LCD according to the invention compared with Case B1 of the pixel electrode of a conventional LCD including one basic region having four domains, the contrast ratio according to the position is symmetrical. Accordingly, when observing the liquid crystal display in up/down and right/left directions, the visibility is uniform.

Referring to FIG. 16, for Case B2, Case B3, Case B4 and Case B5 of the exemplary embodiment of the pixel electrode in the LCD according to the invention compared with Case B1, the transmittance change according to the gray level change is similar to a reference curve such that gray inversion is not generated. Accordingly, the display quality is excellent.

Figure 18:
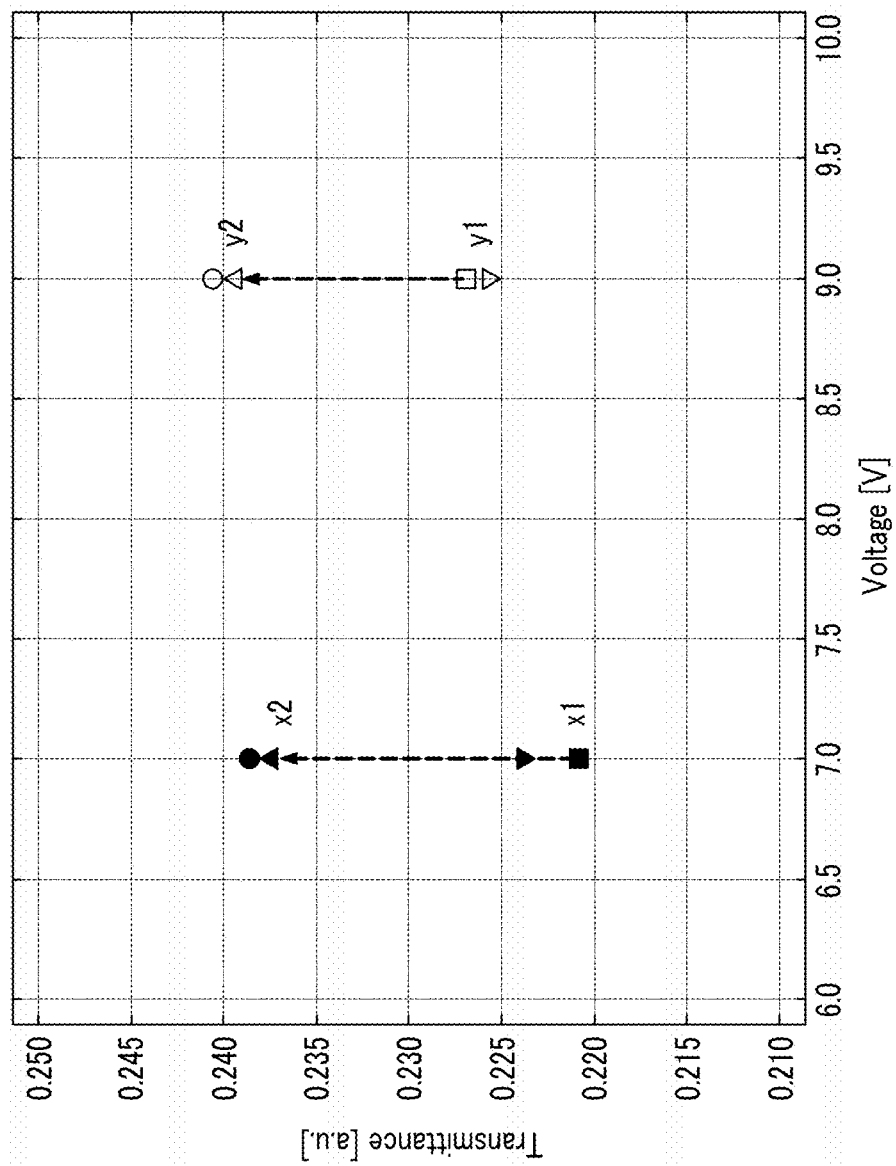
FIG. 18 is a graph of a transmittance result of another experimental example of a LCD according to the invention.

Next, another experimental example according to the invention will be described with reference to FIG. 18. FIG. 18 is a graph of transmittance of another experimental example of a LCD according to the invention. The y-axis represents transmittance in percent (%) and the x-axis represents voltage in volts (V).

In the experimental example, in an exemplary embodiment including the pixel electrode in a LCD according to the invention, cases x1 and y1 using a linear polarizer and cases x2 and y2 using a circular polarizer are divided, the voltage of a same magnitude is applied to the liquid crystal layer, and then the transmittance change is measured and is shown in FIG. 18.

In FIG. 18, case x1 and case x2 are the results when the liquid crystal layer is applied with a voltage of about 7 V, and case y1 and case y2 are the results when the liquid crystal layer is applied with a voltage of about 9 V.

Referring to FIG. 18, for cases x2 and y2 using the circular polarizer, compared with cases x1 and y1, the transmittance is increased by about 6-8% for the same voltage. In this way, when using the circular polarizer in an exemplary embodiment of a LCD according to the invention, the transmittance of the LCD may be increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate; and
a pixel electrode on the first substrate, and comprising a first sub-pixel electrode and a second sub-pixel electrode,
wherein
the first sub-pixel electrode and the second sub-pixel electrode comprise a cross stem, and a plurality of minute branches extending from the cross stem, and
the second sub-pixel electrode comprises two cross stems adjacent in a first direction, and a center transverse stem between the two cross stems and extending in a second direction crossing the first direction, the center transverse stem comprising a cutout.

2. The liquid crystal display of claim 1,
wherein the cutout extends in the second direction, and
further comprising two cutouts each extending from an edge of the second sub-pixel electrode toward a center portion of the second sub-pixel electrode, the two cutouts separated from each other.

3. The liquid crystal display of claim 2, wherein
a width of the cutout is in a range of about 3 microns to about 10 microns.

4. The liquid crystal display of claim 3, wherein
the width of the cutout is in a range of about 4 microns to about 8 microns.

5. The liquid crystal display of claim 4, wherein
the width of the cutout is about 6 microns.

6. The liquid crystal display of claim 3, wherein
the first and second sub-pixel electrodes comprise a plurality of sub-regions having different length directions of the minute branches.

7. The liquid crystal display of claim 6, wherein
the first sub-pixel electrode comprises a basic region having four sub-regions, and
the second sub-pixel electrode has two basic regions.

8. The liquid crystal display of claim 7, wherein
a ratio of a longitudinal length and a transverse length of the basic region is in a range of about 0.76 to about 1.24.

9. The liquid crystal display of claim 8, further comprising:
a second substrate facing the first substrate;
a common electrode on the second substrate; and
a liquid crystal layer between the first substrate and the second substrate,
wherein a plurality of liquid crystal molecules of the liquid crystal layer are aligned with a pretilt in the length directions of the minute branches.

10. The liquid crystal display of claim 9, further comprising:
a first alignment layer on the first substrate; and
a second alignment layer on the second substrate,
wherein at least one of the first alignment layer, the second alignment layer and the liquid crystal layer comprises a light-polymerized material.

11. The liquid crystal display of claim 1, wherein
a width of the cutout is in a range of about 3 microns to about 10 microns.

12. The liquid crystal display of claim 11, wherein
the width of the cutout is in a range of about 4 microns to about 8 microns.

13. The liquid crystal display of claim 12, wherein
the width of the cutout is about 6 microns.

14. The liquid crystal display of claim 11, wherein
the first and second sub-pixel electrodes comprise a plurality of sub-regions having different length directions of the minute branches.

15. The liquid crystal display of claim 14, wherein
the first sub-pixel electrode comprises a basic region having four sub-regions, and
the second sub-pixel electrode comprises two basic regions.

16. The liquid crystal display of claim 15, wherein
a ratio of a longitudinal length and a transverse length of the basic region is in a range of about 0.76 to about 1.24.

17. The liquid crystal display of claim 16, further comprising:
a second substrate facing the first substrate;
a common electrode on the second substrate; and
a liquid crystal layer between the first substrate and the second substrate,
wherein a plurality of liquid crystal molecules of the liquid crystal layer are aligned with a pretilt in the length directions of the minute branches.

18. The liquid crystal display of claim 17, further comprising:
a first alignment layer on the first substrate; and
a second alignment layer on the second substrate,
wherein at least one of the first alignment layer, the second alignment layer and the liquid crystal layer comprises a light-polymerized material.

19. The liquid crystal display of claim 1, wherein:
the first and the second sub-pixel electrodes comprise a plurality of sub-regions having different length directions of the minute branches.

20. The liquid crystal display of claim 19, wherein
the first sub-pixel electrode comprises a basic region having four sub-regions, and
the second sub-pixel electrode comprises two basic regions.

21. The liquid crystal display of claim 20, wherein
a ratio of a longitudinal length and a transverse length of the basic region is in a range of about 0.76 to about 1.24.

22. The liquid crystal display of claim 21, further comprising:
a second substrate facing the first substrate;
a common electrode on the second substrate; and a liquid crystal layer between the first substrate and the second substrate, wherein a plurality of liquid crystal molecules of the liquid crystal layer are aligned with a pretilt in the length directions of the minute branches.

23. The liquid crystal display of claim 22, further comprising:

a first alignment layer on the first substrate; and a second alignment layer on the second substrate, wherein at least one of the first alignment layer, the second alignment layer and the liquid crystal layer comprises a light-polymerized material.

24. The liquid crystal display of claim 1, further comprising:

a second substrate facing the first substrate;

a common electrode on the second substrate; and a liquid crystal layer between the first substrate and the second substrate, wherein a plurality of liquid crystal molecules of the liquid crystal layer are aligned with a pretilt in length directions of the minute branches.

25. The liquid crystal display of claim 24, further comprising:

a first alignment layer on the first substrate; and a second alignment layer on the second substrate, wherein at least one of the first alignment layer, the second alignment layer and the liquid crystal layer comprises a light-polymerized material.

* * * * *